United States Patent [19]
Wach

[11] Patent Number: 5,901,261
[45] Date of Patent: May 4, 1999

[54] FIBER OPTIC INTERFACE FOR OPTICAL PROBES WITH ENHANCED PHOTONIC EFFICIENCY, LIGHT MANIPULATION, AND STRAY LIGHT REJECTION

[75] Inventor: Michael L. Wach, Byron, Ga.

[73] Assignee: Visionex, Inc., Warner Robins, Ga.

[21] Appl. No.: 08/879,077

[22] Filed: Jun. 19, 1997

[51] Int. Cl.[6] .................................................. G02B 6/26
[52] U.S. Cl. ........................... 385/38; 385/116; 385/117; 385/126; 385/33; 385/85
[58] Field of Search ............................. 385/38, 901, 902, 385/33, 85, 117, 118, 146, 147, 116, 126

[56] References Cited

U.S. PATENT DOCUMENTS

| | | | |
|---|---|---|---|
| 3,796,905 | 3/1974 | Tomii et al. | 385/120 |
| 3,874,783 | 4/1975 | Cole | 385/120 |
| 3,906,241 | 9/1975 | Thompson | 356/301 |

(List continued on next page.)

FOREIGN PATENT DOCUMENTS

| | | |
|---|---|---|
| 0 185 782 | 7/1986 | European Pat. Off. . |
| 0 210 869 | 2/1987 | European Pat. Off. . |
| 0 286 419 | 10/1988 | European Pat. Off. . |

OTHER PUBLICATIONS

"Fiber Optic Particle Concentration Sensor," by Anthony A. Boiarski, pp. 122–125 in *SPIE*, vol. 566, Fiber Optic And Laser Sensors III (1985).

"Intensity Modulated Fiber Optic Sensors Overview," by David A. Krohn, Ph.D., pp. 2–11 in *SPIE*, vol. 718, Fiber Optic and Laser Sensors IV (1986).

"Specialty Optical Fibers Resolve Challenging Application Problems," by Brian P. McCann, pp. 48, 51 and 52 in *Lightwave*, Nov. 1994.

"Submicrometer Intracellus Chemical Optical Fiber Sensors," by Weihong Tan et al., pp. 778–781 in *Science*, vol. 258, 30 Oct. 1992.

*Primary Examiner*—Hung N. Ngo
*Attorney, Agent, or Firm*—Jones & Askew, LLP

[57] ABSTRACT

Fiber optic interfaces that can readily reject the collection of stray light while efficiently collecting desired light that has interacted with the subject media. These fiber optic interfaces may be incorporated into optical probes and probe tips for enhanced photonic efficiency, light manipulation, and stray light rejection. These probes are particularly well suited for use in instrumentation including spectral analysis and the light-scattering branches of spectroscopy. Specifically, the optical probes exhibit benefits for spectral analyses including those referred to as Raman, fluorescence, Rayleigh, luminescence, and diffuse reflectance. A typical probe includes a center emitter fiber surrounded by collection fibers. These fibers are arranged into a bundle and positioned behind a window. The end faces of the emitter fiber and the collection fibers are shaped to form an optical interface with desired optical characteristics. The outer and inner faces of the window may also be shaped to enhance the desired characteristics of the optical interface. In one configuration, the window's outer face is formed into a convex face so that specular reflections arising from the window's outer face are directed back toward the emitter. In another configuration, the fiber assembly is encapsulated in a low refractive index window. The window's inner face is in intimate contact with the fiber end face. In this configuration, the low refractive index encapsulent facilitates light manipulation while providing protection, isolation, and other benefits.

49 Claims, 10 Drawing Sheets

U.S. PATENT DOCUMENTS

| | | | |
|---|---|---|---|
| 3,910,677 | 10/1975 | Becker et al. | 385/33 |
| 4,191,446 | 3/1980 | Arditty et al. | 385/42 |
| 4,380,365 | 4/1983 | Gross | 385/33 |
| 4,449,535 | 5/1984 | Renault | 385/12 |
| 4,573,761 | 3/1986 | McLachlan et al. | 385/12 |
| 4,610,513 | 9/1986 | Nishioka et al. | 350/96.1 |
| 4,615,581 | 10/1986 | Morimoto | 385/60 |
| 4,654,532 | 3/1987 | Hirschfeld | 385/43 |
| 4,707,134 | 11/1987 | McLachlan et al. | 356/342 |
| 4,732,448 | 3/1988 | Goldenberg | 350/96.18 |
| 4,812,003 | 3/1989 | Dambach et al. | 385/79 |
| 4,816,670 | 3/1989 | Kitamura et al. | 385/33 |
| 4,830,460 | 5/1989 | Goldenberg | 350/96.26 |
| 4,914,284 | 4/1990 | Halldorsson et al. | 356/141.5 |
| 4,919,891 | 4/1990 | Yafuso et al. | 385/12 |
| 4,979,797 | 12/1990 | Nemeth | 385/12 |
| 4,995,691 | 2/1991 | Purcell, Jr. | 385/29 |
| 5,011,254 | 4/1991 | Edwards et al. | 385/33 |
| 5,011,279 | 4/1991 | Auweter et al. | 385/15 |
| 5,037,180 | 8/1991 | Stone | 385/31 |
| 5,074,632 | 12/1991 | Potter | 385/31 |
| 5,112,127 | 5/1992 | Carrabba et al. | 356/301 |
| 5,146,917 | 9/1992 | Wagnières et al. | 607/89 |
| 5,166,756 | 11/1992 | McGee et al. | 356/446 |
| 5,196,005 | 3/1993 | Doiron et al. | 606/7 |
| 5,253,312 | 10/1993 | Payne et al. | 385/31 |
| 5,263,952 | 11/1993 | Grace et al. | 606/7 |
| 5,269,777 | 12/1993 | Doiron et al. | 606/7 |
| 5,330,465 | 7/1994 | Doiron et al. | 606/7 |
| 5,402,508 | 3/1995 | O'Rourke et al. | 385/31 |
| 5,421,928 | 6/1995 | Knecht et al. | 156/153 |
| 5,432,880 | 7/1995 | Diner | 385/85 |
| 5,764,840 | 6/1998 | Wach | 385/123 |

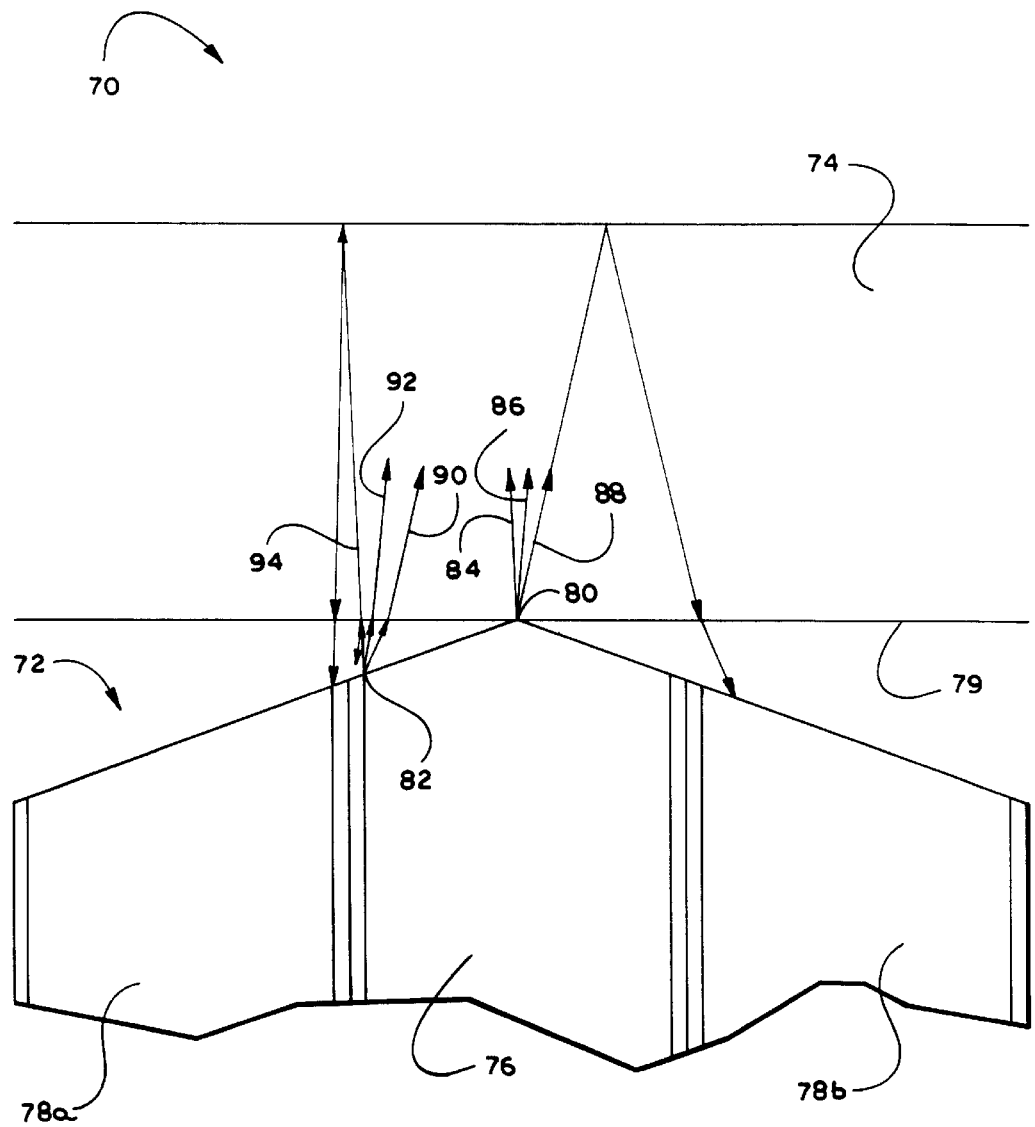
Fig_3

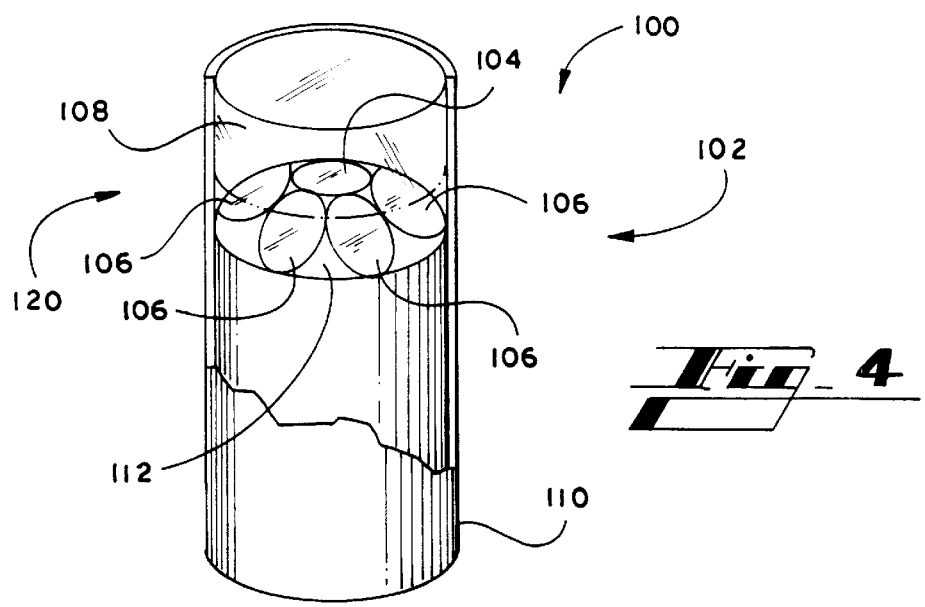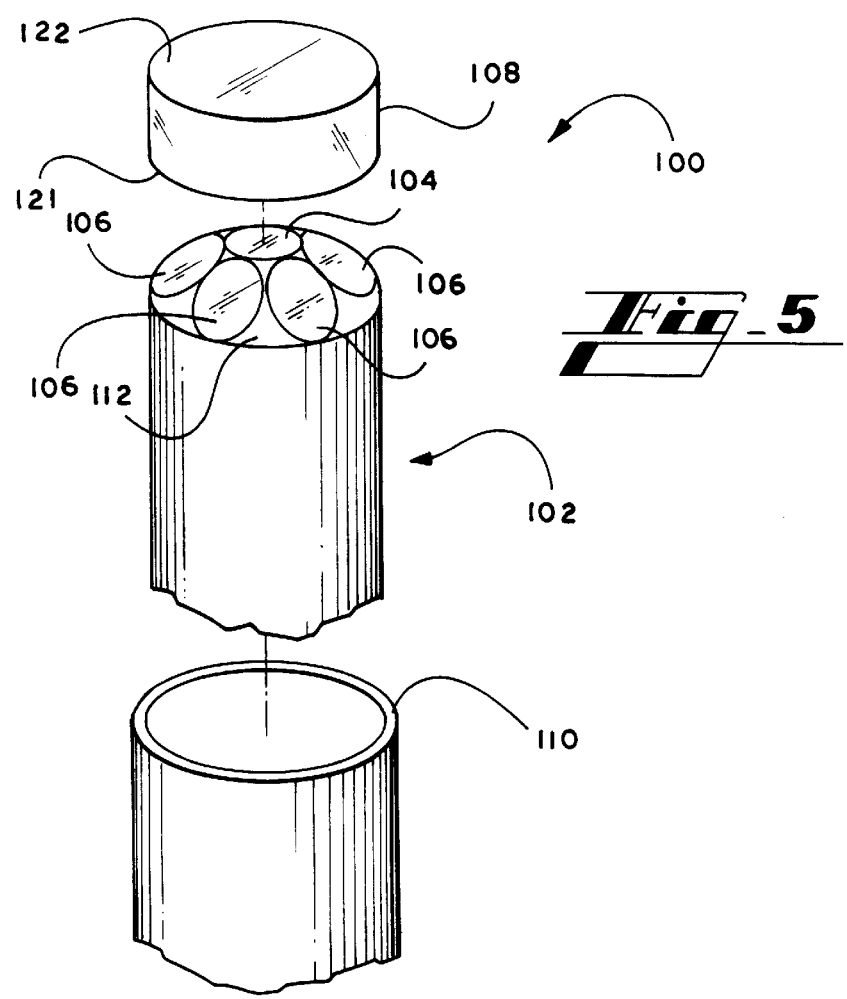

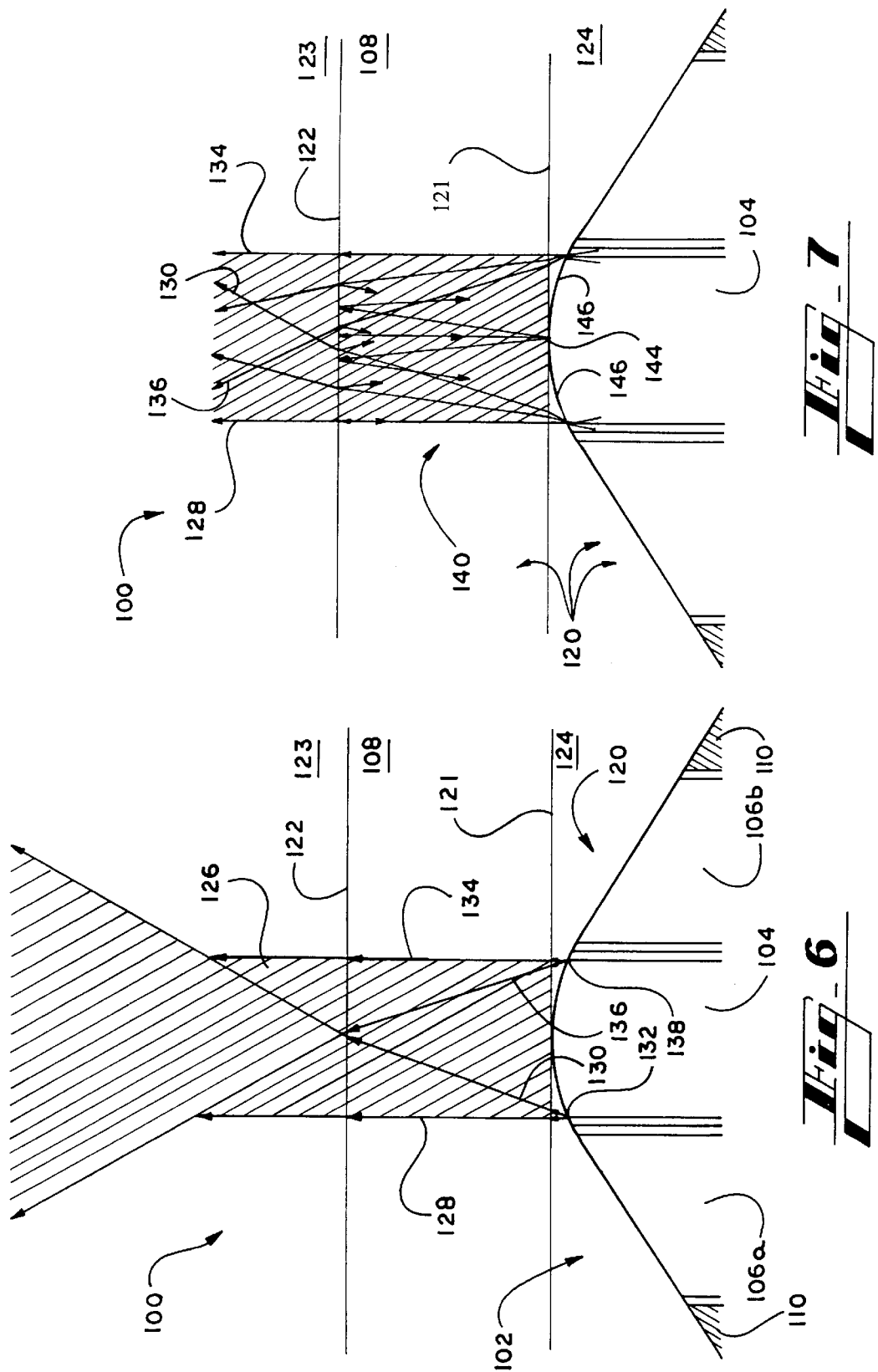

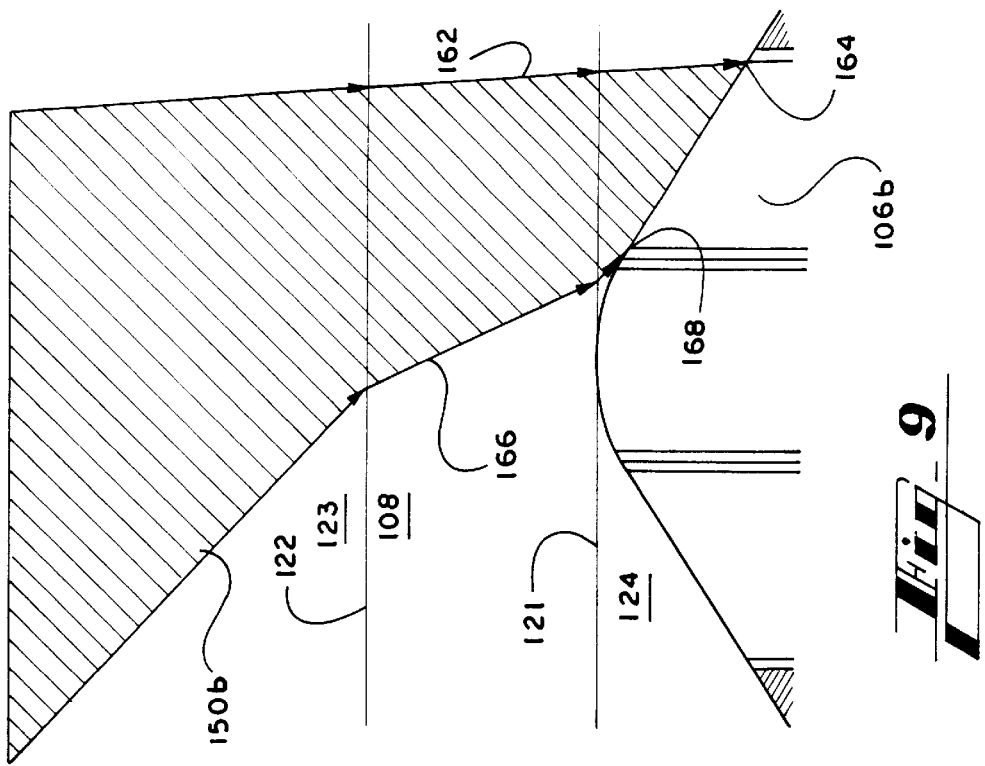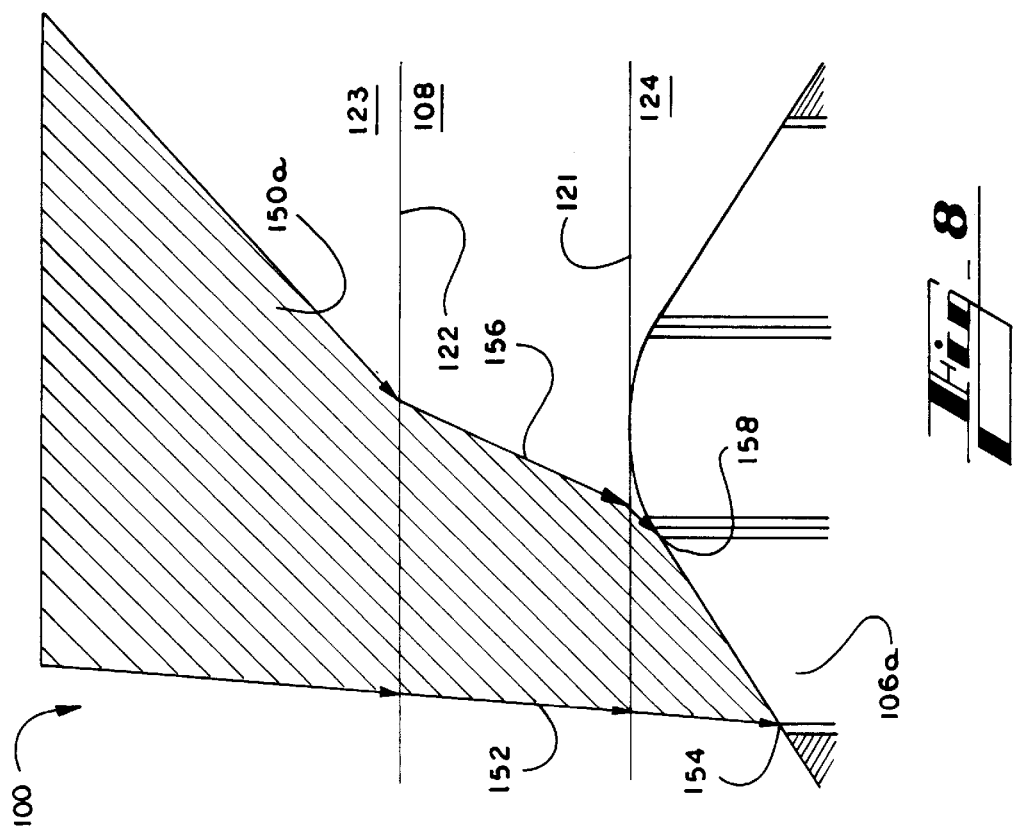

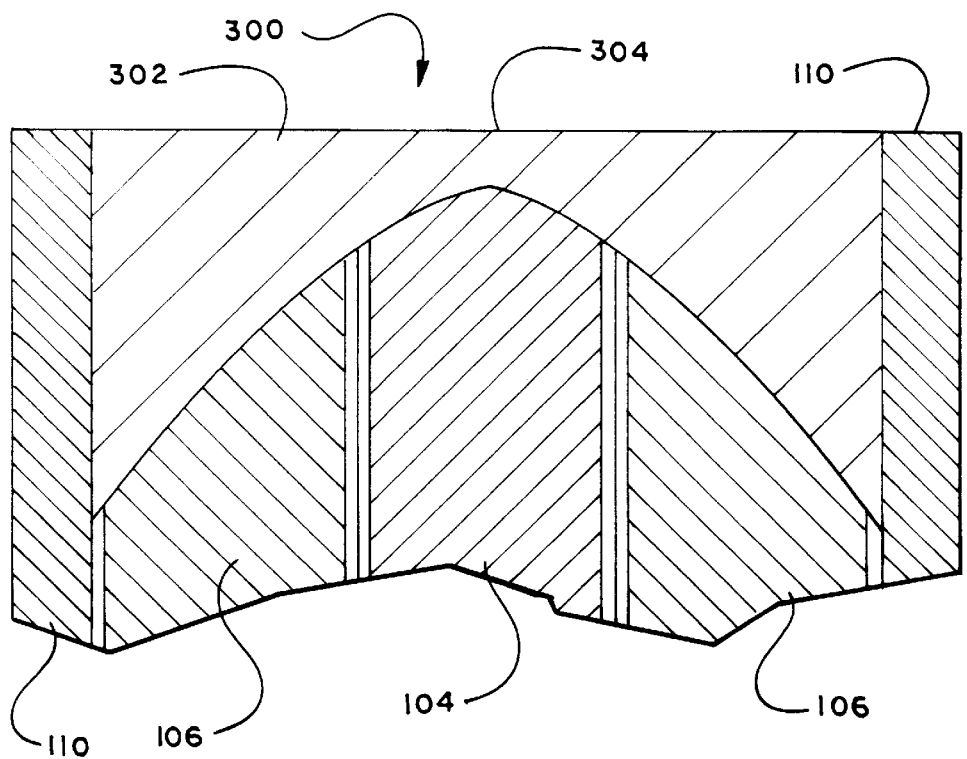
*Fig_13*
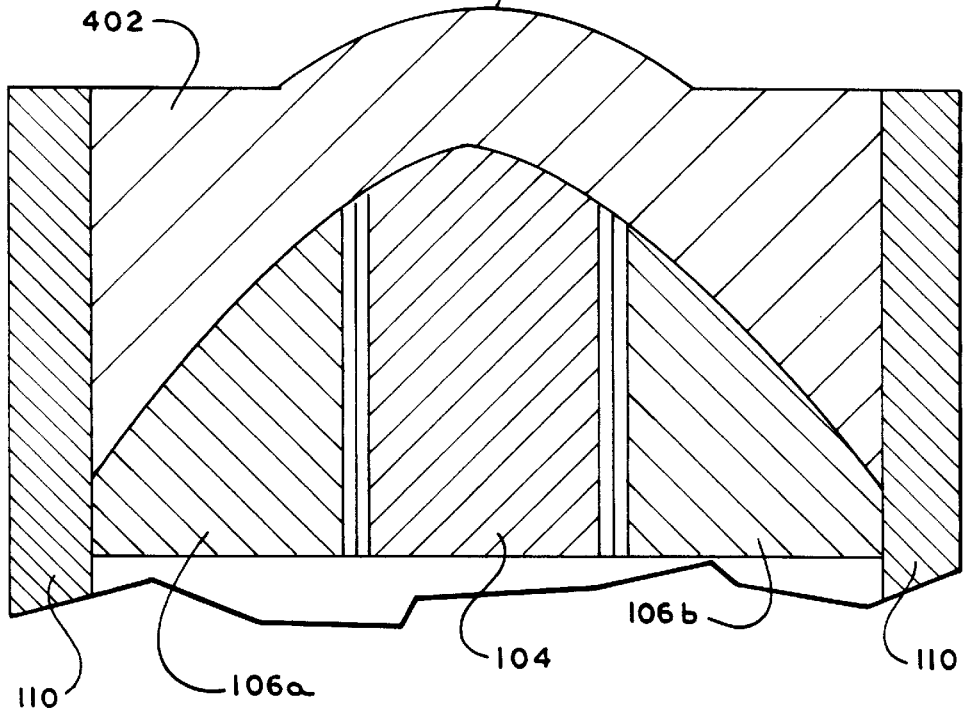
*Fig_14*

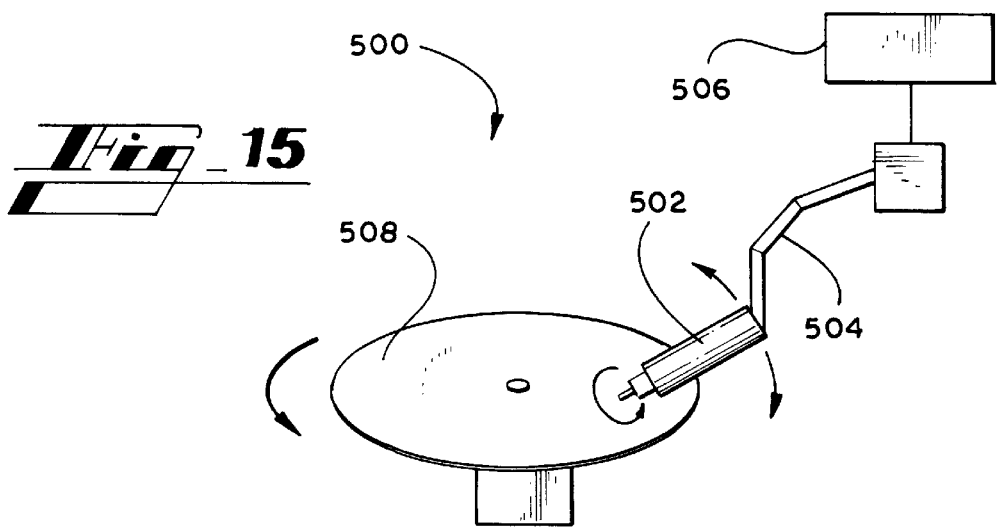
Fig_15
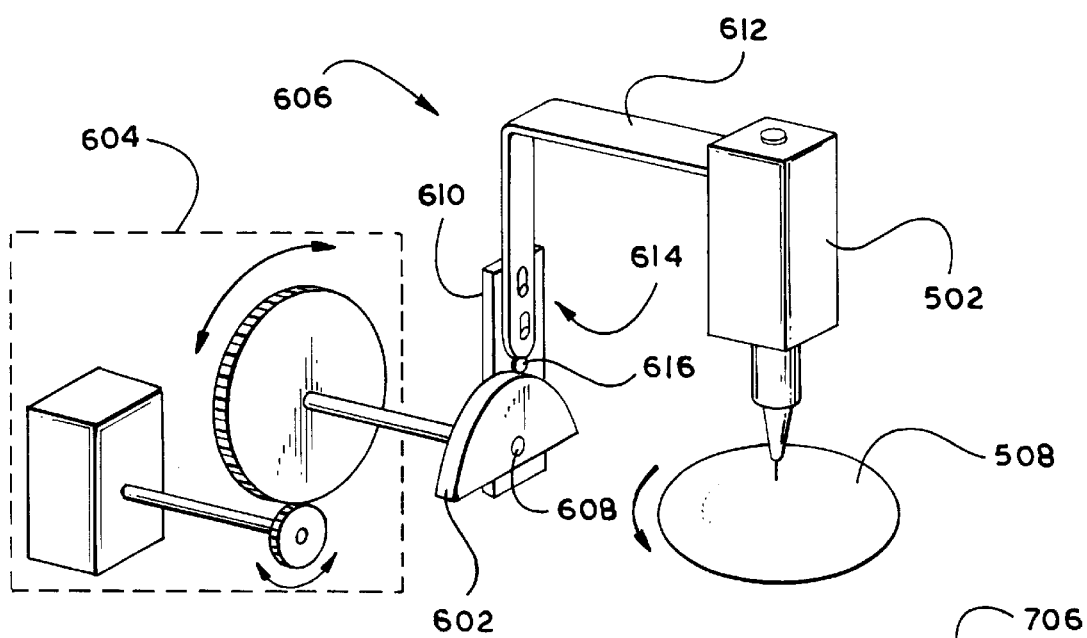
Fig_16
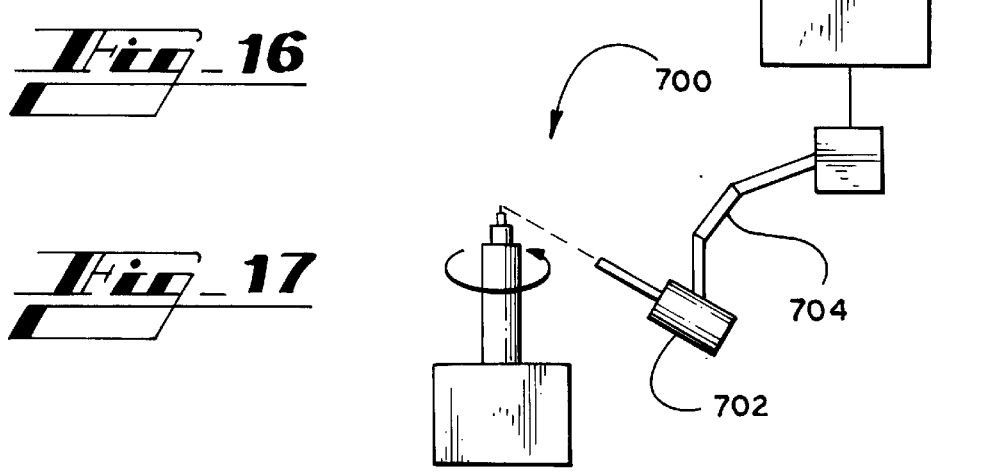
Fig_17

FIBER OPTIC INTERFACE FOR OPTICAL PROBES WITH ENHANCED PHOTONIC EFFICIENCY, LIGHT MANIPULATION, AND STRAY LIGHT REJECTION

FIELD OF THE INVENTION

The present invention relates to optical fibers. More particularly, the invention relates to improved fiber optic interfaces and their incorporation into optical probes for enhanced photonic efficiency, light manipulation, and stray light rejection. These fiber optic interfaces are particularly well suited for use in instrumentation including spectral analysis and the light-scattering branches of spectroscopy.

BACKGROUND OF THE INVENTION

Optical fibers are powerful for many uses. In many applications, optical fibers are employed to cast illumination onto and/or gather light from a subject. In an important class of applications, the characteristics of light emitted on a subject under inspection are compared with the characteristics of light returning from the subject. To facilitate this type of application, one or more emitter fibers and one or more collector fibers may be arranged into an optical cable to create a fiber optic probe.

A fiber optic interface having desired optical or physical characteristics may be formed as an integral part of the optical probe, typically at the tip of the probe. Alternatively, the desired optical interface may be formed as a separate probe tip that may be attached to the end of an optical cable. To create the desired optical interface, the end faces of the probe fibers may be shaped to have desired optical or physical characteristics. In this manner, the probe may be designed to remotely analyze a subject under inspection to ascertain important parameters.

Oftentimes, the optical fibers must be removed from direct contact with the subject under inspection. The tip of the probe may be capped by a protective window, which results in stand off between the fiber end faces and the subject under inspection. Separating the fiber end faces from the subject under inspection while achieving acceptable optical performance has shown to be a major difficulty in fiber optic probes. Suitable fiber optic interface technology has not been available. The lack of devices meeting this requirement severely limits the utilization of many powerful analytical techniques, which would otherwise be suitable for remote analysis using optical fibers. Thousands of high-volume applications are pending the availability of suitable probes.

Avoiding direct contact between the probe and the subject under inspection is often required for several important reasons. First, physical isolation of the optical fibers is required in mechanically abusive environments. Second, isolation from chemical attack is required in chemically harsh environments. Third, stand off from very dark or opaque media is often required to facilitate concurrence of the illumination zone (i.e., the area illuminated by the probe emitter) and the reception zone (i.e., the field of view of the probe collector). Fourth, in many applications it is advantageous to orient the subject under inspection with respect to the fibers so that the effects of specific photon-matter interactions can be suitably isolated. The prior art shows numerous attempts to satisfy the need for improved fiber optic probes; however, it will be seen that each attempt is severely lacking.

To illustrate the shortcomings of prior art probes, FIG. 1 is a scaled, side cross-sectional view of the emission and reception patterns of a prior art probe tip 10 that is common in the industry. The probe tip 10 includes an optical bundle 12 having a flat end face profile positioned behind a disk-shaped window 14, which is typically formed of sapphire or diamond. An emitter fiber 16 is surrounded by a ring of equal-sized collection fibers 18, represented by the collection fibers 18a and 18b that are visible in the cross-sectional view. FIG. 1 illustrates two problems that are experienced with this type of probe: poor overlap between the illumination zone of the illumination fiber 16 and the reception zones of the collection fibers 18, and collection of back-reflections from the outer face 32 of the window 14.

The problem of poor overlap between the illumination zone 26 (shaded area) of the emitter fiber 16 and the reception zone 28 (cross-hatched area) of the collection fibers 18 results from the flat-faced interface profile, which causes the optical axis 22 of the emitter fiber 16 to be parallel with the optical axes of the collection fibers 18, as illustrated by the optical axis 24 of the collection fiber 18b. This causes poor coupling between the illumination zone 26 of the emitter fiber 16 and the reception zones 28 of the collection fibers 18. In fact, much of the reception zone 28 of the collection fiber 18b does not overlap with (i.e., is not illuminated by) the illumination zone of the illumination fiber 16.

The problem of collection of back-reflections from the outer face 32 of the window 14 is illustrated by the reflections 30a and 30b (closely-hatched regions) from the outer face 32 of the window 14. These reflections are cast directly into the collection fibers 18a and 18b without having interacted with the medium external to the window. This is an example of the more general problem of the collection of unwanted light, which is referred to as the collection of back-reflected, extraneous, or stray light. Unwanted light can propagate in the collection fibers 18 and, thus, drown out the desired light returning from the subject under inspection.

The problem of collecting of back-reflected light is exacerbated by the fact that extraneous light frequently propagates within the emitter fiber in conjunction with the principal source light. This extraneous light is often generated within the fiber by source photon interactions within the fiber core, such as silica-Raman and fluorescence. These phenomena may cause the fiber to become overfilled with the extraneous light. From the fiber's overfilled state, the extraneous light diverges from the fiber end face at a greater angle than that of normally-propagating light. In some optical interface configurations, this causes the back-reflected extraneous light to more readily enter the collection fibers.

Neither the emitted silica-Raman light nor its back reflection from the outer face 32 of the window 14 is depicted in FIG. 1. The emitted silica-Raman light diverges more rapidly from the end face of the emitter fiber 16 than the illumination zone 26 of the normally-propagating light illustrated in FIG. 1. Although the majority of the emitted silica-Raman light is located within the illumination zone 26 defined by normally-propagating light, a significant quantity of silica-Raman light is emitted from the end face of the emitter fiber 16 at angles beyond those at which normal propagation can be sustained. The portion of the emitted silica-Raman light that is outside the illumination zone 26 of the normally-propagating light may be back-reflected off the outer face 32 of the window 14. In the flat-faced interface profile of the probe shown in FIG. 1, this portion of the back-reflected silica-Raman light typically remains outside of the theoretical angular acceptance capabilities 28 of the collection fibers 18. Nevertheless, the effect of back-reflected silica-Raman light is an important consideration when designing probe interfaces that are not flat-faced.

Some attempts have been made in the prior art to address the problems described above. For example, McGee et al., U.S. Pat. No. 5,166,756, describes a probe for analyzing powders. In this probe, a multiplicity of illumination and collection fibers are arranged behind a sapphire rod that functions as a window. The outer face of the window is inclined relative to the end faces of the optical fibers. The inclined outer face of the window directs the back reflections from this surface outside of the reception capability of the collection fibers. This allows the subject to be analyzed with reduced interference caused by the back reflections from the end face of the window. In addition, the inclined outer face of the window may be used to mechanically orient certain materials to facilitate photonic analysis of a specific material parameter. For example, a planar surface of a powder grain may become aligned with the inclined outer face upon contact with the window, which may reduce the collection of specular reflections from the powder grain's planar surface and, thus, allow collection of a diffuse component of the reflected light.

The probes described by McGee et al. suffer from several drawbacks. First, the inclined outer face of the window separates the optical fibers from the sample by a significant distance, which reduces the coupling efficiency of the probe. Second, the overlap between the illumination zone of the emitter fibers and the reception zone of the collection fibers is not precisely controlled, which further reduces efficiency and requires the use of finely stranded fiber optic bundles. These finely stranded bundles are expensive and somewhat limited in their transmission characteristics. Third, the probe's optical characteristics are highly dependent on the position of the illumination and collection fibers relative to each other and relative to the window's outer face. Maintaining repeatability of these positional factors is difficult to achieve when fabricating probes. Therefore, probe-to-probe performance repeatability, particularly as it relates to broad band intensity, suffers.

McLachlan et al., U.S. Pat. No. 4,573,761, describes a probe in which the optical axis of an emitter fiber and the axes of multiple collection fibers are directed into intersection by bending the fibers near their ends. This method is difficult to incorporate into manufacture, produces variability, results in a restrictively large assembly, and causes losses at the sharp bends. From their positions behind a window, the collection fibers collect back reflections from the window that devastate measurement quality. Other methods described in the prior art include the use of lenses in the probe interface to direct an optical fiber's patterns of emission and reception. The introduction of these additional elements causes mounting, alignment, manufacturing, and sealing problems. As with the bends described by McLachlan et al., the introduction of additional elements into the probe interface decrease the robustness and increase the size of the probe interface.

FIG. 2 is a scaled, side cross-sectional view of another prior art probe tip 50 similar to those described in O'Rourke, et al., U.S. Pat. No. 5,402,508. The probe tip 50 includes a fiber optic bundle 52 positioned behind a sapphire window 54. The fiber optic bundle 52 includes a center emitter fiber 56 surrounded by collection fibers 58, represented by the collection fibers 58a and 58b visible in the cross-sectional view. The end faces of the collection fibers 58 are angled, which through refraction causes the optical axes 60a, 60b of the collection fibers 58a, 58b to converge towards the optical axis 62 of the emitter fiber 56. Typically, the angle between the end faces of the collection fibers 58 and the inner face of the window 54 is about 20°.

Although the probe tip 50 demonstrates certain improvements over the McGee et al. probe tip, it suffers from severe stray light collection that impairs measurement quality. That is, the reflections 64a and 64b from the outer face 66 of the window 54 are cast into the collection fibers 58a and 58b without having interacted with the medium external to the window. In fact, the stray light performance of the probe shown in FIG. 2 is worse than that of the flat-faced probe depicted in FIG. 1. This is due, in part, to the over-filled nature of silica-Raman light emitted from the emitter fiber 56. As noted previously, the over-filled silica-Raman light is emitted from the end face of the emitter fiber 56 at angles beyond which normal propagation can be sustained. This causes a portion of the over-filled silica-Raman light to be reflected off the outer face 66 of the window 54 at an orientation beyond the limits for normally-propagating light. Because the collection fibers 58 of the FIG. 2 probe are angled with respect to outer face 66 of the window 54, they collect more over-filled silica-Raman light than the flat-faced fiber shown in FIG. 1.

O'Rourke, et al. describes increasing the space between the fiber bundle 52 and the inner face of the window 54, apparently to reduce the collection of back-reflections from the window. However, the additional space severely reduces the coupling efficiency of the probe, increases the size of the probe interface, and presents manufacturing difficulties.

O'Rourke, et al. also teaches that reflections from outer face 66 of the window 54 are not troublesome for deployment in liquids; however, the opposite is often the case. Windows fabricated from strong, chemically resistant materials such as sapphire and diamond have refractive indices much higher than most solutions. For example, sapphire's refractive index is approximately 1.77, whereas water's refractive index is about 1.33. This refractive index differential results in reflection from light exiting the window. The reflection's strength and potential for entrance into adjacent collection fibers increases as the angle of light incidence diverges from perpendicular. Lower refractive index window materials such as silica can be employed; however, they are typically much weaker physically and, thus, require a thick window. The increased window thickness results in increased collection of back-reflected light and decreased coupling efficiency.

In sum, the prior art does not describe probe interfaces, or methods for designing and manufacturing probe interfaces, to overcome the drawbacks described above. The proliferation of unsuccessful attempts in the prior art to create suitable fiber optic probes demonstrates the technical complexity of the problem. Despite intense activity and numerous designs, a strong need persists for improved fiber optic interfaces that can be employed in instrument probes and other applications. In particular, a need exists for fiber optic interfaces, methods for designing fiber optic interfaces, and machines for manufacturing fiber optic interfaces that can readily reject the collection of stray light while efficiently collecting desired light that has interacted with the subject media.

SUMMARY OF THE INVENTION

The present invention provides fiber optic interfaces that can readily reject the collection of stray light while efficiently collecting desired light that has interacted with the subject media. These fiber optic interfaces may be incorporated into optical probes and probe tips for enhanced photonic efficiency, light manipulation, and stray light rejection. Although optical interfaces in accordance with various embodiments of the invention may be incorporated into a wide variety of fiber optic and electro-optical equipment, they are particularly well suited for inclusion in optical probes for instrumentation including spectral analysis and the light-scattering branches of spectroscopy. Specifically, the optical probes provided by the invention exhibit benefits for spectral analyses including those referred to as Raman, fluorescence, Rayleigh, luminescence, and diffuse reflectance.

Generally described, the invention provides an optical interface for a fiber optic device including an emitter fiber defining an end face and a longitudinal axis. The emitter fiber is operable for emitting light defining an illumination zone. The fiber optic device also includes a window having an inner face positioned proximate to the end face of the emitter fiber, and an outer face longitudinally spaced from the inner face. The end face of the emitter fiber progressively slopes away from the outer face of the window with increased radial offset from the longitudinal axis of the emitter fiber.

The fiber optic device may also include a collection device. The end face of the emitter fiber may be shaped to substantially prevent normally-propagating light emerging from the end face of the emitter fiber and reflecting off the outer face of the window from interfering with the operation of the collection device. The collection device may include a collector fiber that is substantially parallel to the emitter fiber. In this case, the end face of the collector fiber may be shaped to direct the reception zone of the collector fiber toward the illumination zone. In appropriate environments, the fiber optic interface may be utilized without the window. In this architecture, the fiber optic interface can, among other things, emit light upon a flat surface, reject specular reflections from the surface, and collect desired light returning from the surface.

The profile of the end face of the emitter fiber may lie between two mathematically boundaries, which are referred to as the minimum angle profile and the maximum angle profile. The minimum angle profile is defined to approximate a profile that is minimized at its center point while directing the normally-propagating light emitted from the end face of the emitter fiber and reflecting off of the outer face of the window into the emitter fiber. The minimum angle profile then progressively slopes with radial offset across the end face of the emitter fiber so that the slope remains minimized while directing the normally-propagating light emitted from the end face of the emitter fiber and reflecting off of the outer face of the window into the emitter fiber. The maximum angle profile is defined to approximate a profile whose slope is maximized near its center point while directing the normally-propagating light emitted from the end face of the emitter fiber and reflecting off of the outer face of the window into the emitter fiber. The maximum angle profile then progressively slopes with radial offset across the end face of the emitter fiber so that the slope remains maximized while directing the normally-propagating light emitted from the end face of the emitter fiber and reflecting off of the outer face of the window into the emitter fiber.

In one configuration, the end face of the emitter fiber includes a central profile section that is substantially perpendicular to the longitudinal axis of the emitter fiber. In addition, the end face of the emitter fiber includes an outer rim profile section that progressively slopes away from the outer face of the window. In another configuration, the end face of the emitter fiber is substantially pointed at the longitudinal axis of the emitter. In yet another configuration, the end face of the collector fiber slopes away from the outer face of the window with a slope at least as great as the maximum slope of the end face of the emitter fiber. For example, the end face of the collector fiber may progressively slope away from the outer face of the window with increased radial offset from the longitudinal axis of the emitter fiber.

According to an aspect of the invention, the fiber optic device includes a second collector fiber that is substantially parallel to the emitter fiber. The second collector fiber defines an end face that is adjacent to the end face of the emitter fiber. The end face of the second collector fiber is shaped to direct the reception zone toward the illumination zone. The emitter fiber and the first and second collector fibers may be aligned so that the longitudinal axes of the fibers lie substantially in the same plane.

According to another aspect of the invention, the fiber optic device includes a ring of collector fibers substantially parallel to the emitter fiber and defining end faces that are adjacent to the end face of the emitter fiber. The end face of each collector fiber is shaped to direct the reception zone toward the illumination zone. The end face of each collector fiber may slope away from the outer face of the window with a slope at least as great as the maximum slope of the end face of the emitter fiber. For example, the end face of each collector fiber may progressively slope away from the outer face of the window with increased radial offset from the longitudinal axis of the emitter fiber. In addition, the end faces of the emitter fiber and the collector fibers may define a combined profile that is symmetrical about the longitudinal axis of the emitter fiber.

According to yet another aspect of the invention, a fiber optic device may include a collector fiber operable for collecting light within a reception zone and a ring of emitter fibers substantially parallel to the collector fiber and operable for emitting light defining an illumination zone. Each emitter fiber defines an end face that is adjacent to the end face of the collector fiber. The fiber optic device also includes a window having an inner face positioned proximate to the end faces of the emitter and collector fibers, and an outer face longitudinally spaced from the inner face. The end face of each emitter fiber is shaped to direct the illumination zone toward the collection zone.

Furthermore, the outer face of the window may be substantially perpendicular to the longitudinal axis of the emitter, may define a convex profile, or may define a convex central profile section. In addition, the inner face of the window may be substantially perpendicular to the longitudinal axis of the emitter, may define a convex profile, or may be in contact with the end faces of the emitter and collector fibers.

An optical interface according to the invention may be incorporated into a fiber optic cable. Alternatively, an optical interface according to the invention may be incorporated into a fiber optic tip for removable attachment to a fiber optic cable. The end faces of the emitter fiber and the collector fiber may be configured so that the illumination zone overlaps with the reception zone at or proximate to the outer face of the window.

Alternatively, the end faces of the emitter and collector fibers may be configured so that the illumination zone overlaps with the reception zone at a predefined depth within a subject under inspection so as to avoid the collection of reflected light from a first component of the subject under inspection and to collect reflected light from a second component of the subject under inspection. For this configuration, the first component may be closer to the outer face of the window than the second component.

In addition, the end faces of the emitter fiber and the collector fiber may be configured to substantially prevent silica-Raman light emerging from the end face of the emitter fiber and reflecting off the outer face of the window from entering the end face of the collector fiber. The end face of the emitter fiber may also be configured to accentuate the divergence of the illumination zone, or to accentuate the convergence of the illumination zone.

The invention also provides methods for designing and machines for manufacturing the fiber devices described above. It is, therefore, an object of the invention to provide fiber optic interfaces, methods for designing fiber optic interfaces, and machines for manufacturing fiber optic interfaces that can readily reject the collection of stray light and specular reflections while efficiently collecting desired light that has interacted with the subject media.

That the present invention improves over the drawbacks of the prior art and accomplishes the objects of the invention will become apparent from the detailed description of the preferred embodiment to follow.

BRIEF DESCRIPTION OF THE DRAWINGS

FIG. 3 is a side cross-sectional view of the emission and reception patterns of an optical probe tip including a cone-shaped interface profile.

FIG. 4 is a perspective view of a fiber optic probe tip in accordance with an embodiment of the present invention.

FIG. 5 an exploded perspective view of the fiber optic probe tip of FIG. 4.

FIG. 6 is a side cross-sectional view of the fiber optic probe tip of FIG. 4 including ray tracings showing the illumination zone of the emitter fiber.

FIG. 7 is a side cross-sectional view of the fiber optic probe tip of FIG. 4 including ray tracings showing the back reflection pattern of the emitter fiber.

FIG. 8 is a side cross-sectional view of the fiber optic probe tip of FIG. 4 including ray tracings showing the reception zone of a first collection fiber.

FIG. 9 is a side cross-sectional view of the fiber optic probe tip of FIG. 4 including ray tracings showing the reception zone of a second collection fiber.

FIG. 13 is a side cross-sectional view of a fiber optic probe tip including an encapsulent window.

FIG. 14 is a side cross-sectional view of a fiber optic probe tip including a convex encapsulent window.

FIG. 15 is a diagram illustrating a computer-controlled machine for manufacturing fiber optic probe tips in accordance with an embodiment of the present invention.

FIG. 16 is a diagram illustrating a cam-surface-controlled machine for manufacturing fiber optic probe tips in accordance with an embodiment of the present invention.

FIG. 17 is a diagram illustrating a computer-controlled laser ablation machine for manufacturing fiber optic probe tips in accordance with an embodiment of the present invention.

DETAILED DESCRIPTION OF THE INVENTION

Figure 2:
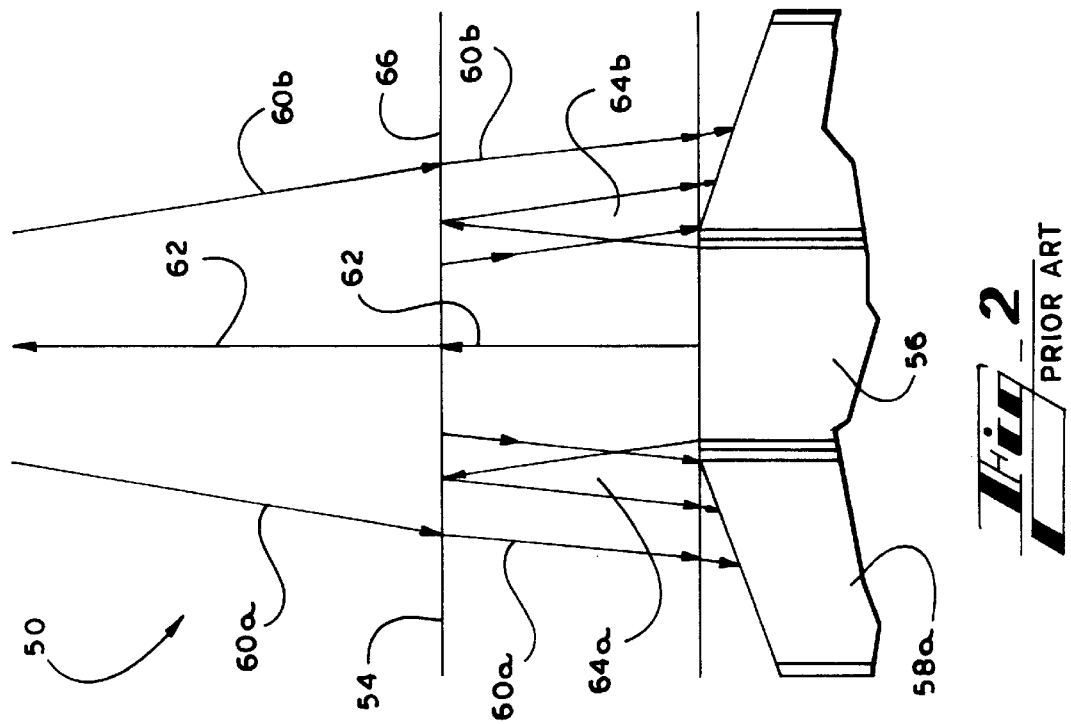
FIG. 2 is a side cross-sectional view of the emission and reception patterns of a prior art optical probe tip including an angled interface profile.

Generally described, the invention is directed to interfaces for optical probes that manipulate the reception and emission characteristics of the fibers' end faces. This allows the interactions between emitted light and the collected light to be advantageously manipulated and controlled. A typical probe includes a center emitter fiber surrounded by collection fibers. These fibers are arranged into a bundle and may be positioned behind a window. The end faces of the emitter fiber and the collection fibers are shaped to form an optical interface with desired optical characteristics. The outer and inner faces of the window may also be shaped to enhance the desired characteristics of the optical interface.

Typically, the shape of the end face of the emitter fiber precludes back reflections of light off of the outer face of the window from entering the adjacent collection fibers. This is accomplished by imparting a convergence characteristic across the end face of the emitter fiber that increases with increasing radial offset from the fiber's center axis. In addition, the reception zones of the collection fibers are directed toward the illumination zone. Specifically, the end faces of the collection fibers are shaped to cause the reception zones of the collection fibers to converge toward the illumination zone of the emitter fiber. The convergence characteristic across the end face of each collection fiber may also increase with increasing radial offset from the emitter fiber so that receptivity is further heightened. Alternatively, the end face of the collection fiber may be profiled at a constant angle that imparts the maximum refractive effect regardless of the radial offset from the emitter fiber. In either manner, the collection fibers efficiently gather scattered light but are not receptive to specular back reflections.

The fields of emission and reception may also be manipulated to facilitate the rejection of specular reflections from material surfaces while maximizing the collection of responses, such as diffuse reflection, fluorescence, or Raman. For example, the planar surfaces of individual crystals of crystalline powders may be oriented against the end face of the window to facilitate the rejection of specular reflections off of the planar surfaces of the crystals. Similarly, the probe can be used without a window to analyze a flat surface without the influence of specular reflection. To aid in this and other viewing objectives, the illumination and reception zones may be controlled to converge at a desired distance from the fiber's end face or at a desired depth within the subject media. For example, the illumination and reception zones may be controlled to converge on or near the outer face of the window for inspection of very dark subject materials, such as carbon-loaded rubber.

In an alternative configuration, the center fiber may be used as the light collector fiber and the surrounding fibers may be used as emitter fibers. In this case, the end faces of the emitter fibers are shaped to preclude back reflections from reception by the center collection fiber. And, the optical axes of the emitter fibers are directed towards the optical axis of the reception zone of the collection fiber. Typically, the light emitted from the emitter fibers are increasingly directed off-axis across the end faces of the emitter fibers with increasing radial offset away from the collection fiber. Alternatively, the end face of the emitter fiber may be profiled at a constant angle that imparts the maximum refractive effect regardless of the radial offset from the collection fiber. In fact, many of the center-emitter probe configurations described herein may be effectively used as center-collector configurations without significant modification to the probe interface.

In another configuration, the window's outer face is formed into a convex surface so that specular reflections arising from the window's outer face are directed toward the emitter fiber. In yet another important embodiment, the fiber assembly is encapsulated in a low refractive index window. The window's inner face is in intimate contact with the fiber end face. In this configuration, the low refractive index encapsulent facilitates light manipulation while providing protection, isolation, and other window benefits.

Several machines are also described for manufacturing optical probe interfaces in accordance with various embodiments of the present invention. Once the desired profile for the probe tip is designed using the methodology described herein, several types of machines may be used to impart the desired profile on the end of the fiber bundle. The fiber optic bundle is held by a holding device such as a collet, chuck, or similar device that spins the bundle. A robotic arm controlled by the computer holds the bundle against an abrasive disk and changes the angle of orientation of the bundle with respect to the rotating disk to impart the desired profile on the tip of the bundle. Although the profile may be imparted in piece-wise linear angular steps, a smooth profile is preferred. A cam-surface-controlled machine or a computer controlled laser ablation machine may also be used to impart the desired profile on the end face of the bundle.

Exemplary embodiments of the invention will now be described with reference to FIGS. 3–17, in which like elements are indicated by like numerals throughout the figures.

Optical probes including cone-shape interface profiles offer advantages over prior art optical interfaces. These probes with cone-shape interface profiles generally include a bundle of optical fibers including a center emitter fiber surrounded by a ring of collection fibers. The end face of the entire bundle is shaped into a shallow right-triangular cone with the cone tip positioned on the center axis of the emitter fiber. The end face of the bundle is typically positioned behind a disk-shaped window. The cone-shaped emitter fiber directs the light emission so that it converges toward the emitter fiber's center axis.

FIG. 3 is a scaled, cross-sectional view of such an optical probe 70 including a fiber optic bundle 72 with a cone-shaped end face profile positioned behind a sapphire window 74. The fiber optic bundle 72 includes a center emitter fiber 76 surrounded by collection fibers 78, represented by the collection fibers 78a and 78b, which are visible in the cross-sectional view. The end faces of the collection fibers 78 are angled at the same slope as the cone-shaped emitter fiber 76. Typically, the cone is sloped so that an angle of about 20° is formed between the cone's profile and the inner face 79 of the window 74.

To illustrate the window reflections, FIG. 3 shows ray tracings for two points on the end face of the emitter fiber 76, a near-center point 80 and an outer-rim point 82. Three rays 84, 88, 86 and 90, 94, 92 shown at the points 80 and 82, respectively, correspond to the minimum, maximum and average propagation angles within the fiber (−8.5°, 0°, 8.5°). At the outer-rim point 82 of the emitter fiber 76, the emitted light is projected such that window reflections are received by the left collection fiber 78a. At the near-center point 80, which is immediately to the left of the midpoint of the emitter fiber 76, emitted light is projected such that window reflections enter the right collection fiber 78b. Moreover, increasing or decreasing the profile slope will not prevent the reflected light from entering the collection fibers 78. This is because as the slope is increased, the reflected light produced by light emitted near the center of the emitter fiber 76 is strengthened. And as the slope is decreased, the reflected light produced by light emitted near the outer rim of the emitter fiber 76 is strengthened.

Although the cone-shaped probe tip offers advantages over other, prior art probes, several significant limitations are apparent. First, even if the window 74 is thin to minimize the collection of reflected light, a portion of the reflected light from the outer face of the window is reflected back into the collection fibers 78. Second, the sharp point on the end of the emitter fiber 76 is prone to damage due to contact with the window 74. Third, the cone-shape of the emitter fiber 76 spaces the end faces of the collection fibers 78 away from the sample, which reduces the coupling efficiency of the probe. In some circumstances, this may cause the outer portions of the collection fibers 78 to have very poor efficiency.

Other problems may arise in the design of optical probes. The subject's refractive index may vary depending on many factors including temperature and composition. In addition, the subject's refractive index may change independent from the variable which the analysis seeks to isolate. For example, during a chemical reaction, the subject's refractive index may change as a result of a secondary reaction or the addition of various chemicals. Changes in the subject's refractive index, as well as changes in window itself, may result in variance in the back-reflected light from the window. Therefore, the stray light cannot be easily removed by compensation corrections. In gaseous media such as air, the stray light problem is particularly acute.

Although the use of a thin window minimizes the collection of back reflections from the window's outer face, attaching an exceedingly thin window is mechanically difficult and results in a restrictively fragile probe interface. Moreover, to analyze media that are prohibitively absorbing and dark, the window must be thick enough to facilitate overlap between the illumination zone and the reception zone directly on, or very close to, the window's outer face. For these dark subject media, precluding extraneous light from entering the collection fibers is paramount.

FIG. 4 is a side perspective view of a fiber optic probe tip 100 in accordance with an embodiment of the present invention. FIG. 5i an exploded side perspective view of the fiber optic probe tip 100 shown in FIG. 4. The probe tip includes a bundle of optical fibers 102 in which a center emitter fiber 104 is surrounded by a number of collection fibers 106, typically six. The end face of the bundle 102 abuts a window 108 made of a material with desired physical and optical characteristics, such as a sapphire or diamond. The bundle 102 and the window 108 are housed within an outer casing 110. The outer casing 110 is preferably made of metal to allow the probe tip 100 to be assembled using laser welding techniques. However, the outer casing 110 may be made of another durable or flexible material, such as ceramic, rubber, latex, or mylar, if a different fabrication technique is used.

The optical fibers of the bundle 102 may be separately-clad fibers, which are bundled together as shown in FIGS. 4 and 5. The separately-clad fibers shown in shown in FIGS. 4 and 5 are encapsulated within a suitable material 112, such as epoxy, latex, rubber, or mylar; or the fibers may be directly fused together using heat and pressure. Alternatively, the cladding may be stripped off the individual fibers, which are then encased in a solid cladding formed of a suitable material, such as doped silica, silicone, fluropolymer, or another suitable material with a low refractive index. This configuration may be preferred to reduce the spacing between the fibers, which may increase the coupling efficiency of the probe. The end face of the bundle 102 is shaped to form an optical interface 120 with desired characteristics. The inner face 121 and the outer face 122 of the window 108 may also be shaped to enhance the desired properties of the optical interface 120. The probe tip 100 may be formed on the end of a long cable assembly, or it may be configured to be a removable tip that may be attached to a longer probe assembly.

FIG. 6 is a side cross-sectional view of the fiber optic probe shown in FIG. 4. For this illustrative example, the center emitter fiber 104 is a 400-micron silica core diameter, 440-micron silica clad diameter, 0.22 numerical aperture optical fiber. The surrounding collection fibers 106 are identical to the emitter fiber 104. Two out of the total six surrounding fibers, indicated as 106a and 106b, are visible in the cross-sectional view. The window 108 is solid sapphire 0.020" thick. The medium 123 outside the window 108 is air. In addition, the medium 124 between the end face of the bundle 102 and the inner face 121 of the window 108 is air. The process for designing the interface profile 120 is described in detail with reference to FIG. 12. The result of that process is illustrated by the ray tracings shown in FIGS. 6–10.

Specifically, FIG. 6 includes ray tracings that show the illumination zone 126 of the emitter fiber 104. The illumination zone 126 is projected through the medium 124 between the window 108 and the end face of the bundle 102, through the window 108, and into the subject medium 123 outside the window 108. The illumination zone 126 is essentially bounded by the maximum-left-angle (−8.5°) emission ray 128 and the maximum-right-angle (8.5°) emission ray 130 from the extreme left edge 132 of the emitter fiber 104, and the maximum-right-angle (8.5°) emission ray 134 and the maximum-left-angle (−8.5°) emission ray 136 from the extreme right edge 138 of the emitter fiber 104.

FIG. 7 is a side cross-sectional view of the fiber optic probe tip 100 including ray tracings illustrating the reflections 140 of the light emitted by the emitter fiber 104 off the outer face 122 of the window 108. The interface profile 120, namely the shapes of the end face of the emitter fiber 104 and the inner and outer faces 121, 122 of the window 108, causes the reflections 140 to be projected principally back into the emitter fiber. Specifically, the center portion 144 of the end face of the emitter fiber 104 is parallel to the outer face 122 of the window 108, which causes the emissions from the center portion 144 to be reflected back into the emitter fiber. In addition, the outer portions 146 of the end face of the emitter fiber 104 are angled with respect to the outer face 122 of the window 108 so that the angle increases with increasing radial offset, which causes the emissions from the outer portions 146 of the end face of the emitter fiber to be reflected back into the emitter fiber.

FIG. 8 is a side cross-sectional view of the fiber optic probe tip 100 including ray tracings showing the reception zone 150a of a first collection fiber 106a. The collection fiber 106a is aggressively profiled to view interaction between the illumination light and the medium 123 outside the window 108. The reception zone 150a is essentially bounded by the maximum-left-angle (−8.5°) collection ray 152 entering the extreme left edge 154 of the collection fiber 106a, and the maximum-right-angle (8.5°) collection ray 156 entering the extreme right edge 158 of the collection fiber 106a.

FIG. 9 is a side cross-sectional view of the fiber optic probe tip 100 including ray tracings showing the reception zone 150b of a second collection fiber 106b. The end face of the bundle 102 is symmetrical, and so the reception zone 150b is a mirror image of the reception zone 150a of the first collection fiber 106a. The reception zone 150b is essentially bounded by the maximum-right-angle collection ray 162 entering the extreme right edge 164 of the collection fiber 106b, and the maximum-left-angle collection ray 166 entering the extreme left edge 168 of the collection fiber 106b. For ease of manufacturing and repeatability of probe performance, symmetrical end faces are preferred.

Figure 10:
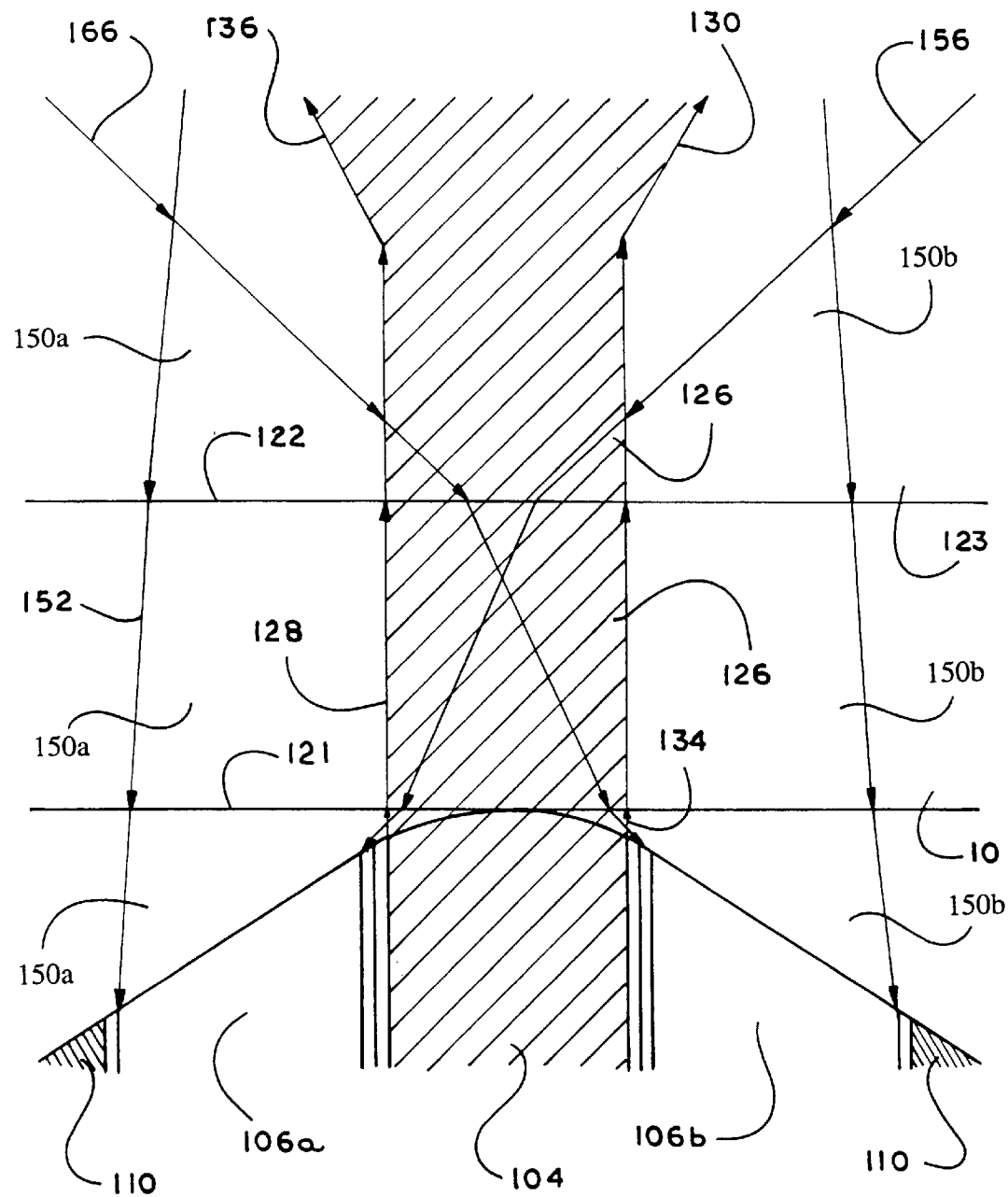
FIG. 10 is a side cross-sectional view of the fiber optic probe tip of FIG. 4 including ray tracings showing the illumination zone of the emitter fiber and the reception zones of the collection fibers.

FIG. 10 is a side cross-sectional view of the fiber optic probe tip 100 including ray tracings showing the illumination zone 126 of the emitter fiber 104 and the reception zones 150a and 150b of the collection fibers 106a and 106b, respectively. The ray tracings are combined on FIG. 10 to illustrate the overlap between the reception zones 150a and 150b of the collection fibers 106a and 106b and the illumination zone 126 of the emitter fiber 104. That is, the reception zones 150a and 150b are manipulated off-axis so that they overlap the illumination zone 126 of the emitter fiber 104. In the configuration shown in FIG. 10, the profile of the end faces of the collection fibers 106a and 106b are aggressively sloped across their entire end face, and the slope is only minimally increased with increasing offset from the emitter fiber 104. Thus, the limit for the refractive effect is approached. In this configuration, the collection fibers 106a and 106b are receptive to viewing interactions occurring directly at the outer face 122 of the window 108 and beyond. Those skilled in the art will understand that the slope of the end faces of the collection fibers 106 may be adjusted for viewing at other desired depths within the subject medium 123 or at desired stand-off distances from the fiber end faces.

Alternatively, the slope of the end faces of the collection fibers 106 may be reduced (i.e., a flatter profile) near the emitter fiber 104 and gradually increased with radial offset. This less-aggressive slope minimizes stray light created by back reflection at the outer face 122 of the window 108 caused by surface imperfections and other irregularities in the window 108. However, this less-aggressive slope is less effective in collecting desired light emanating from the subject medium near the outer face 122 of the window 108. Therefore, the more-aggressive collection fiber slope shown in FIG. 10 is preferable for viewing very dark or opaque media, whereas a less-aggressive collection fiber slope may be preferred for deeper viewing in the presence of window imperfections or other sources of stay light. For example, a less-aggressive collection fiber slope may be useful for viewing clear liquids and gaseous media.

Figure 1:
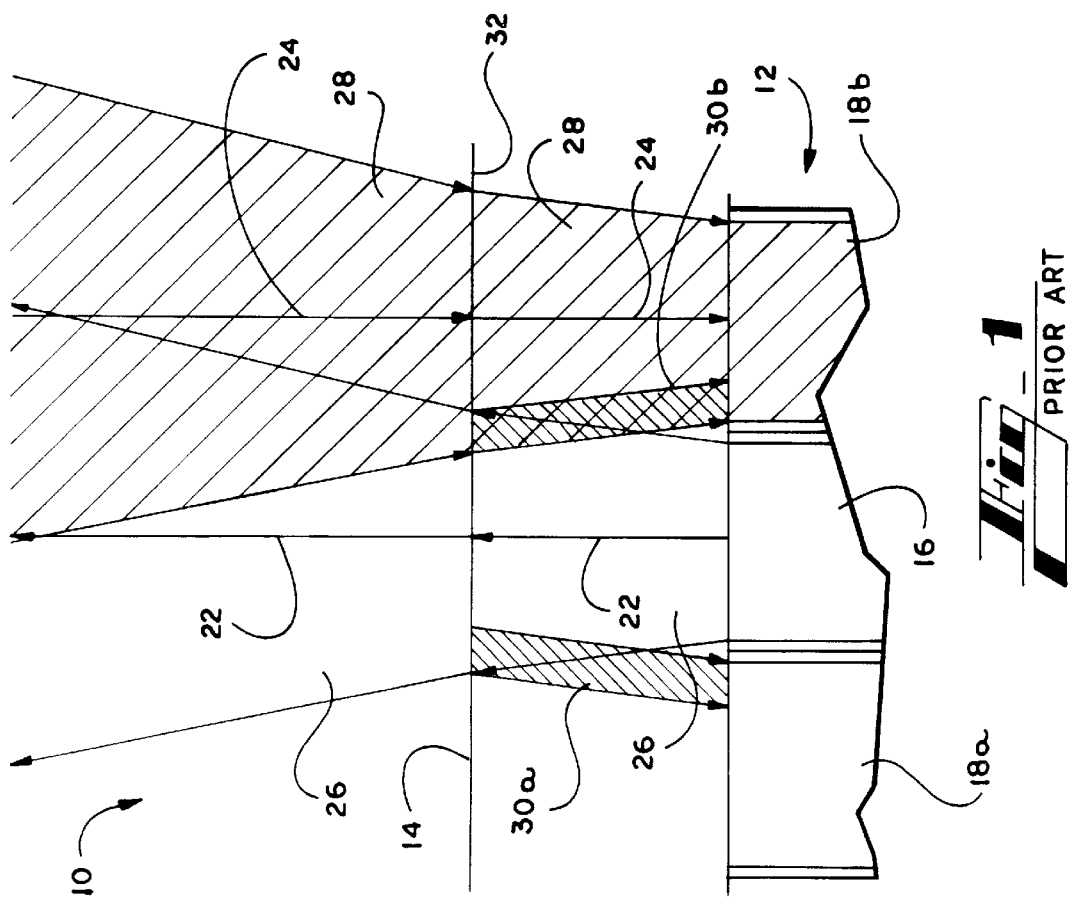
FIG. 1 is a side cross-sectional view of the emission and reception patterns of a prior art optical probe tip including a flat-faced interface profile.
Figure 11:
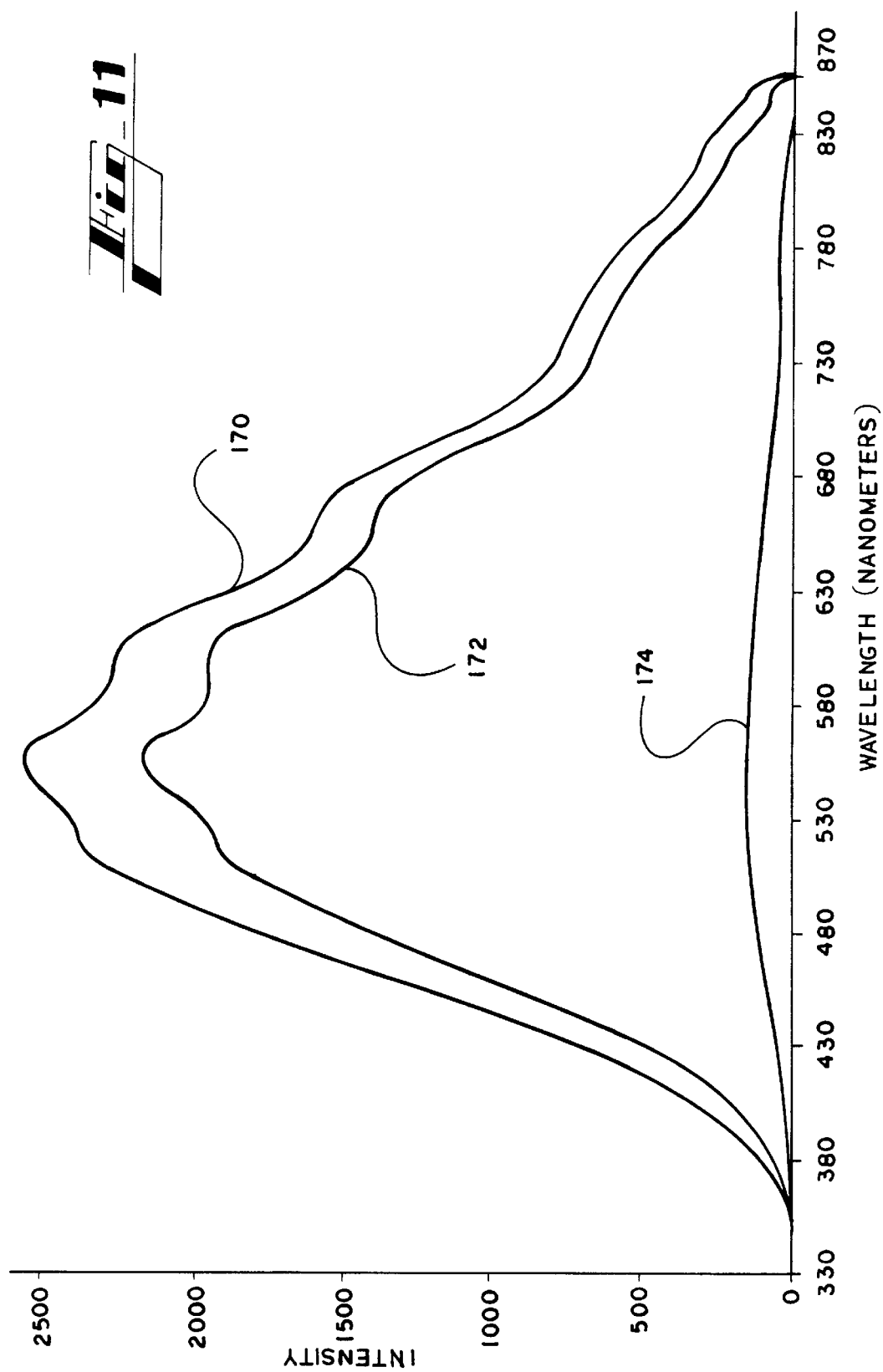
FIG. 11 is a graph of the intensity of the stray light collected by the fiber optic probe tips shown in FIGS. 1, 2, and 4.

FIG. 11 is a graph of the intensity of the stray light collected by the fiber optic probes shown in FIGS. 1, 2, and 4. The plots are stray light intensities (Y-axis) for a white light source. The source's intensity varies as a function of wavelength (X-axis). This variance has not been referenced out; the curve shape is due to the source's intensity profile as a function of wavelength and the electro-optic detector's spectral response. The top graph 170 is the unwanted, stray light collected by the probe as illustrated in FIG. 2, which is similar to the probes described in U.S. Pat. O'Rourke, et al., U.S. Pat. No. 5,402,508. The middle graph 172 is the stray light collected by a probe including a flat-faced interface, as illustrated in FIG. 1. The lowest graph 174 is the test results from the probe tip 100, which is designed and fabricated in accordance with an embodiment of the present invention. As shown by the graphs, the stray light entering the probe tip 100 is virtually negligible in comparison to the prior art probes. The stray light that does enter the probe tip 100 results from imperfections in the window material and surface irregularities and deviation of the fiber's end face profile from desired profile. Therefore, the stray light entering the probe tip 100 can be further reduced by improving the material characteristics of the window 108 and increasing fabrication precision of the end face profile of the probe tip 100.

Figure 12:
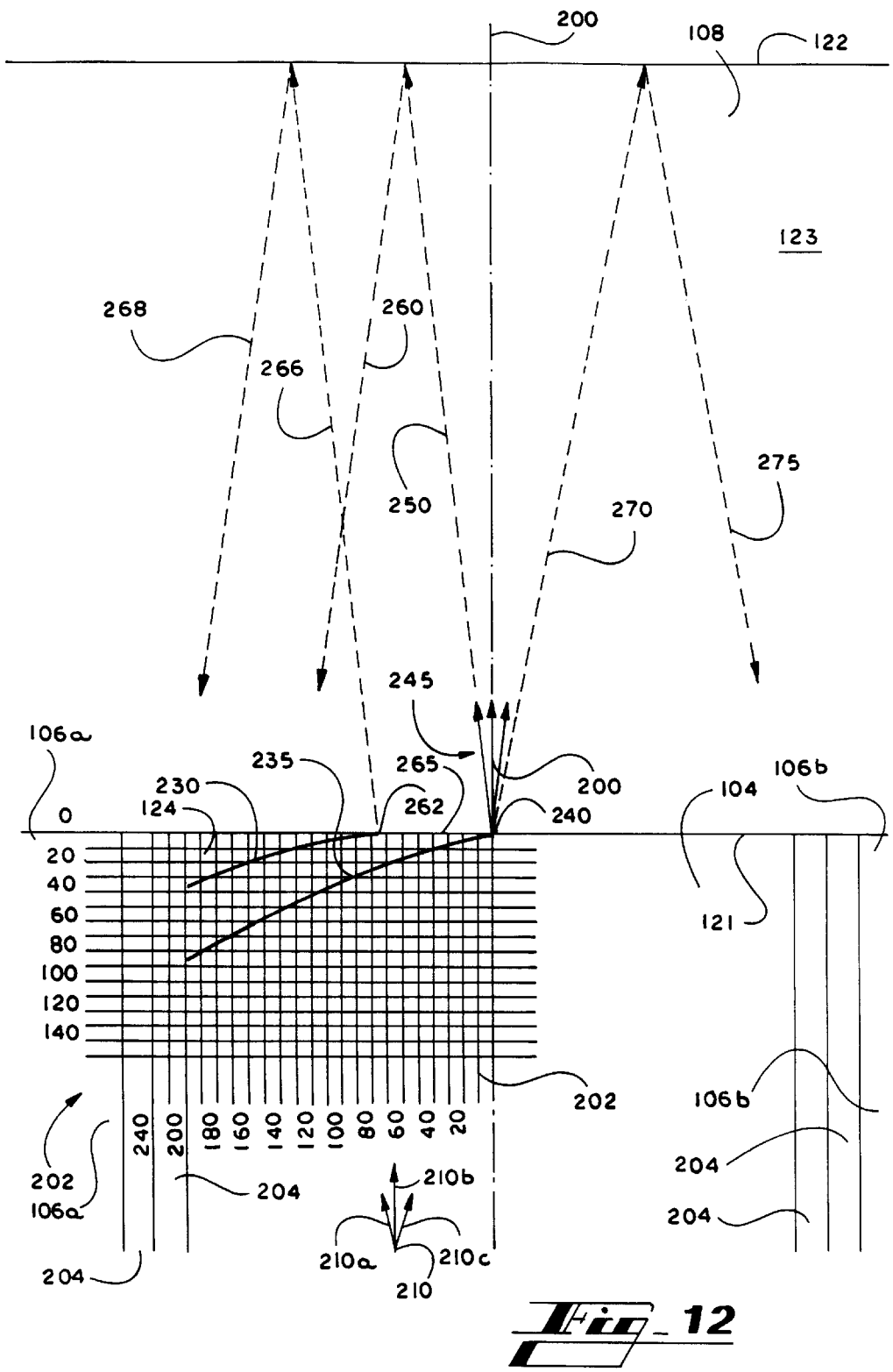
FIG. 12 is a graphical analysis illustrating a method for designing probe interfaces in accordance with an embodiment of the present invention.

FIG. 12 is a graphical analysis illustrating a method for designing probe interfaces in accordance with an embodiment of the present invention. Specifically, the steps describe a methodology for designing a fiber optic interface such that specular reflections, such as those from a window face, are controlled and reception of the desired photonic response is maximized. The design of the probe 100 shown in FIG. 4 will be described to illustrate the design methodology. The probe 100 includes a fiber optic bundle 102 behind a disk-shaped window 108. The bundle 102 includes a center emitter fiber 104 surrounded by a ring of collection fibers 106. In the illustrative example described with reference to FIG. 12, the window reflections caused by the emitter fiber 104 are directed back into the emitter fiber so that they are not received by the collection fibers 106. However, the reflected light may alternatively be directed into, or away from, other components. For example, there may be miscellaneous receiving devices such as photo-detectors, cameras, and imaging fiber bundles in place of the collection fibers. Those skilled in the art will understand that the same design principles may be used to design probes with other desired characteristics. For example, configurations with a center-collector surrounded by a ring of emitter fibers, configurations with two fibers side-by-side, asymmetrical configurations, and so forth may be designed utilizing the design techniques described with reference to FIG. 12.

Referring still to FIG. 12, a side cross-sectional view of the probe tip 100, the window 108, and the surrounding environment are illustrated. The cross-sectional view plane includes the center axis 200 of the emitter fiber 104 and two of the six collection fibers, 106a and 106b. The emitter fiber 104 and the two collection fibers 106a, 106b are aligned so that the cross-sectional view plane is through the center axial plane of each fibers. FIG. 12 is significantly enlarged and drawn to scale. The center emitter fiber 104 is sectioned into analysis segments 202, which are sometimes referred to as finite elements. Specifically, the emitter fiber's core is partitioned into 20 analysis sections 202 between its center axis 200 and its left edge; each analysis section is 10 microns wide. Because the emitter fiber 104 is symmetrical about its center axis 200, the analysis is shown for only the left side.

For clarity, the following values are nominal and not shown with their usual tolerances. For this representative design, each optical fiber has a numerical aperture of 0.22. The cores of the optical fibers are silica, (400-micron diameter, refractive index=1.46). The core of each fiber is surrounded by a cladding 204 formed of doped silica (440-micron outer diameter). Any additional outer coats near the tip of the fiber are removed to minimize the spacing between the fibers. The window 108 is 500 microns thick and made of sapphire (refractive index=1.77). Air (refractive index= 1.0) is the optical medium 123 outside the outer face 122 of the window 108. Air is also the optical medium 124 between the end face of the bundle 102 and the inner face 121 of the window 108.

The theoretical optical characteristics of the representative probe tip 100 are described by the well-known equations governing their operation in the nomenclature familiar to those skilled in the art. The equations' conventions and application intricacies are understood to all those skilled in the art; therefore, these aspects will not be described in detail. Equations 1–4 are basic light propagation equations. Equation 5 is a derived equation describing optical characteristics of refractive end faces of optical fibers.

$$\alpha_i = -\alpha_r \qquad 1.$$

Describes surface reflection; $\alpha_i$=Angle of incidence; $\alpha_r$=Angle of reflection.

$$N_1 \sin \alpha_1 = N_2 \sin \alpha_2 \qquad 2.$$

Snell's Law, which describes refraction; $\alpha_1$=Angle of incidence; $\alpha_2$=Angle of refraction; $N_1$=Refractive index of medium from which a ray leaves; $N_2$=Refractive index of medium into which a ray enters.

$$\sin \alpha_C = N_2/N_1 \qquad 3.$$

Describes angular propagation limits for optical fiber; also describes the critical angle for total internal reflection between two arbitrary media of varying refractive indices; $N_1$=Refractive index of core; $N_2$=Refractive index of cladding; $\alpha_C$=Absolute value of angular limits for propagation within an optical fiber via total internal reflection.

$$NA = (N_1^2 - N_2^2)^{1/2} \qquad 4.$$

Defines the numerical aperture of an optical fiber in terms of its material make up; $N_1$=Refractive index of core; $N_2$=Refractive index of cladding.

$$N_{core} \sin (\theta + \phi) = N_{medium} \sin (\phi + \alpha) \qquad 5.$$

Correlates angular orientation between rays external to fiber end face and rays propagating within fiber core; $N_{core}$= Refractive index of fiber core; $N_{medium}$=Refractive index of medium surrounding fiber end face; $\theta$=Angle of ray propagating within the fiber core taken with respect to the fiber's longitudinal axis; $\alpha$=Angle of ray propagating outside the fiber end face taken with respect to the fiber's longitudinal axis; $\phi$=Angle of refractive profile of fiber end face. The profile angle is taken at the point of ray intersection with the fiber end face and defined as the angle between the surface normal and the fiber's longitudinal axis.

These equations are used to predict the orientation of light propagating within the core towards the end face of a fiber. Based on these equations, it can be determined that light propagates within the fibers at angles approximately between −8.5° and 8.5° relative to the fiber's longitudinal axis. Since these are the limiting values of normal light propagation within the emitter fiber 104, three rays 210a, 210b, and 210c oriented at −8.5°, 0°, and 8.5°, respectively, are graphically traced in FIG. 12 to indicate the propagation limits of normal light within the fibers. Given these limiting values, the refractive indices of the relevant media, and the thickness and the angles of the faces of the window 108, the end face of the emitter fiber 104 may be designed to cause reflections from the outer face window 108 to be directed back into the emitter fiber 104.

To design the shape of the end face of the emitter fiber 104, two profiles are generated for the end face. The first profile is a minimum angle profile 230, in which the emitter fiber 104 is as flat as possible at its center point 240 while directing the normally-propagating reflections back into the emitter fiber. The slope of the minimum angle profile 230 is minimized with radial offset across the end face. That is, the slope of the minimum angle profile 230 is as flat as possible while directing the normally-propagating reflections back into the emitter fiber 104. Typically, the minimum angle profile 230 is flat (zero slope) in the center portion of the end face, and the outer portion of the end face progressively slopes with increasing radial offset across the end face, as shown in FIG. 12 for the representative probe tip 100.

The second profile is a maximum angle profile 235, in which the slope of the end face of emitter fiber 104 is maximized near its center point 240 while directing the normally-propagating reflections back into the emitter fiber. The slope of the maximum angle profile 235 is maximized with radial offset across the end face. That is, the slope of the maximum angle profile 235 is as steep as possible while directing the normally-propagating reflections back into the emitter fiber 104. Typically, the maximum angle profile 235 is pointed at the center 240 of the end face of the emitter fiber 104, and progressively slopes with increasing radial offset across the entire end face, as shown in FIG. 12 for the representative probe tip 100.

Utilizing the equations, it is determined that the limiting three rays ($-8.5°, 0°, 8.5°$) 210 for normal light propagating within emitter fiber 104 are refracted by the silica-sapphire interface to new orientations of $-7°, 0°, 7°$ when emerging from the flat (i.e., zero slope) portion of the end face of the emitter fiber 104 and propagating through the window 108. These limiting rays, indicated by the three-ray pair 245, define the propagation limits for normal light propagating through the window 108 from the flat portion of the end face of the emitter fiber 104.

Generating the minimum angle profile 230 is an iterative process. To generate the first pass for the minimum angle profile 230, the center 240 of the emitter fiber 104 is given a flat slope as a starting point. The minimum angle profile 230 is generated by initially using the limiting-left-emitting ($7°$) ray 250, which corresponds to the $8°$ limiting propagation ray 210a within the fiber 104. This ray reflects off the outer face 122 of the window 108 and returns as the limiting-left-reflected ray 260. Because the limiting-left-reflected ray 260 is directed back into the emitter fiber 104 for the representative probe tip 100, the light reflection from the center 240 of the emitter fiber 104 is inherently precluded from entry into the adjacent collection fibers 106a and 106b. Thus, the initial flat profile is suitable for the center area of the minimum angle profile 230 for the representative probe tip 100. But if the back reflections are not so contained, the design can be adapted. The specific modifications will be described following the description of the general design procedure.

The minimum angle profile 230 is then extended radially from the center 240. Typically, the flat profile is extended to the limiting-left zero slope point 262 to form a flat profile section 265 near the center 240 of the emitter fiber 104. The limiting-left zero slope point 262 is the farthest radial point that projects a limiting-left-emitting ray 266 that returns as a limiting-left-reflected ray 268 that does not project beyond the left border of the end face of the emitter fiber 104. To facilitate the design process, the end face of the emitter fiber 104 is typically analyzed segment-by-segment using the analysis segments (also known as finite elements) 202. Thus, the limiting-left zero slope point 262 typically corresponds to the farthest left edge of the farthest left analysis segment 202 that produces a limiting-left-reflected ray 268 that does not project beyond the left edge of the end face of the emitter fiber 104.

As the minimum angle profile 230 is extended radially beyond the limiting-left zero slope point 262, the slope of the next analysis segment 202 is adjusted away from the window 108 so that the limiting-left-reflected ray from the farthest left edge of the analysis segment does not project beyond the left border of the end face of the emitter fiber 104. To facilitate the design process, the slope of the minimum angle profile 230 is typically increased in $5°$ increments. Note that for a sloped analysis segment 202, both a silica-air interface and then an air-sapphire interface must be considered when tracing the rays.

Once a new slope has been selected for the minimum angle profile 230, the new profile slope is extended radially to subsequent analysis segments 202 until the limiting-left-reflected ray is projected beyond the left border of the end face of the emitter fiber 104. At this point, the slope of the minimum angle profile 230 is again increased in $5°$ increments away from the window 108 until the limiting-left-reflected ray from the farthest left edge of the analysis segment 202 does not project beyond the left border of the end face of the emitter fiber 104. This process is repeated across the left side of the end face of the emitter fiber 104 to complete the first pass for the minimum angle profile 230.

It should be understood that as the first pass for the minimum angle profile 230 is generated, the limiting-left-reflected rays are projected radially into regions in which the profile, and thus the separation between the end face of the emitter fiber 104 and the inner face 121 of the window 108, have not been fully defined. Therefore, on the first pass a starting estimate of the minimum angle profile 230 is used. Several iterative passes are then conducted until the iterations converge to a minimum angle profile 230 with the desired accuracy. In each iterative pass, the profile produced by the previous pass is used as the starting profile.

Those skilled in the art will understand that the size of the analysis segments 202 and the size of the slope increments may be reduced to increase precision of the final minimum angle profile 230. In addition, the limiting-left boundary for the limiting-left-reflection rays may be taken as the left border of the core of the emitter fiber 104, the left border of the outer cladding 204, or some other specific point outside the core of the adjacent collection fiber 106a. However, because the minimum angle profile 230 is only a design guide, and because other factors effect the optical performance of the resulting optical interface, extremely high precision in the minimum angle profile 230 is not typically required. Rather, the final profile of the probe tip 100 is determined through an optimization process using experimental results obtained under the expected operating conditions of the probe.

Once the minimum angle profile 230 has been determined, the maximum angle profile 235 is generated in a similar fashion. Starting at the center 240 of the emitter fiber 104, the maximum-acceptable-emitted ray 270 and its angular orientation are determined. This ray reflects off the outer face 122 of the window 108 as a maximum-acceptable-reflected ray 275 that projects to the right border of the end face of the emitter fiber 104. Thus, this ray defines the maximum angular orientation of normally-propagating light that can be projected through the window 108 from the center point 240 of the emitter fiber while meeting the criteria that corresponding reflected light from the window's outer face 122 will be precluded from entering the collector fiber 106b. The slope of the maximum angle profile 235, which results in emitted rays traversing the window 108, is then back calculated. Specifically, using the maximum-acceptable-emitted ray's 270 orientation in the window 108, the angle of the corresponding ray within the medium 124 between the window and the end face of the emitter fiber 104 is back calculated. From this, the maximum angle profile 235 in the vicinity of the fiber's center point 240 is back calculated.

The maximum angle profile 235 is then extended radially across the end face of the emitter fiber 104 segment by segment. The slope of each analysis segment 202 is determined so that the limiting-right-emitted ray emitted from each segment projects to the right border of the end face of the emitter fiber 104. Whereas the minimum angle profile 230 primarily addresses controlling the light associated with the 8.5° limiting propagation ray 210a, the maximum angle profile 235 primarily addresses controlling the light associated with the −8.5° limiting propagation ray 210c. Hence, the −8.5° limiting propagation ray 210c is utilized to generate the maximum angle profile 235.

Unlike the minimum angle profile 230, the maximum angle profile 235 for each analysis segment 202 is not incremented in predefined degree increments. Rather, the slope for each analysis segment 202 is selected so that the limiting-right-emitted ray from the right edge of the analysis segment is as close as possible without projecting radially beyond the right border of the emitter fiber. Again, both a silica-air interface and then an air-sapphire interface must be considered when tracing the rays from a sloped analysis segment 202. Care must be taken so as to insure that the sizes of the analysis segments 202 are not too large so as to result in lack of back reflection control; smaller incremental distances produce higher profile precision. As with the minimum profile angle 230, the maximum angle profile 235 is determined through an iterative process using a suitable estimate for the first pass.

These two profiles 230, 235 define the limiting theoretical constraints for design acceptability. Therefore, these profiles should be used as guidelines and should not be considered to define the actual physical boundaries for the end face of the emitter fiber 104, which should be well within the theoretical limits. Generally, the two profiles 230, 235 are used both as design constraints and for general guidelines to design a profile for the end face of the emitter fiber 104 that produces desired light manipulation characteristics for a specific application. Several design objectives may be considered in selecting the actual profile for the end face of the emitter fiber 104.

To minimize back reflection interference, the profile should maximize the separation between the collection fibers 106 and the back-reflected light rays. Thus, the best profile for minimizing back reflection interference is a compromise between the maximum and minimum profiles 235, 230.

A profile that has zero slope near the fiber's center axis 200 (as does the minimum angle profile 230) is preferred for many applications. This flat-tipped fiber end face profile reduces the separation between the end faces of the collection fibers 106 and the inner face 121 of the window 108, which increases the coupling efficiency of the probe. A flat-tipped fiber end face is also mechanically more robust, and produces a beneficial near-field effect.

Compared to a profile that tends toward the maximum angle profile 235, a profile that tends towards the minimum angle profile 230 also reduces the divergence of the illumination zone 126. This increases the penetration of the illumination zone 126 into the subject medium 123 and causes the emitted rays to strike the window 108 at angles closer to perpendicular. Since reflected ray intensity generally increases as the angle of incidence diverges from perpendicular, the minimum angle profile 230 typically reduces the intensity of the light reflected off the outer face 122 of the window 108. In addition, the intensity of the light reflected by imperfections in the window 108 are typically reduced by maintaining the angle of incidence closer to perpendicular.

Moreover, from a fabrication standpoint, it is advantageous for the collection fibers 106 to be sloped away from the window 108 at an angle equal to or greater than the outer rim of the face of the emitter fiber 104. This allows the end face of the entire bundle 102 to be fabricated in a smooth convex shape. Hence, by minimizing the profile angle at the outer portion of the emitter fiber 104, greater design flexibility (and control) is available for profiling the collection fibers 106. In other words, a profile for the emitter fiber 104 tending toward the minimum angle profile 230 allows the design of the collection fibers to begin at a lower slope, which gives the designer more slope to work with when designing the profile of the collection fibers 106. This may be advantageous if the reception zones of the collection fibers 106 are to be configured to achieve certain reception objectives, such as causing the reception zones of the collection fibers 106 to overlap the illumination zone 126 of the emitter fiber 104 at or near the outer face 122 of the window 108.

Nevertheless, a profile for the emitter fiber 104 tending toward the maximum angle profile 235 may be advantageous for certain applications. As the profile of the emitter fiber 104 approaches the maximum angle profile 235, the illumination zone 126 rapidly diverges. This rapid divergence characteristic, often referred to as high numerical aperture, can be utilized to significant advantage in many applications. Therefore, it is an important aspect of this invention that probes having wide-divergence of the illumination zones can be designed and manufactured without the negative aspects that have accompanied conventional high numerical aperture fibers in various applications.

Once the profile of the emitter fiber 104 has been determined, the profile of the collector fibers 106 is designed in a manner similar to that described for the emitter fiber 104. Of course, the profile of the collector fibers 106 is dependent upon the desired reception zone and other optical characteristics for a particular application. In a similar fashion to the emitter fiber 104, the slope of the collection fiber profile is usually progressively increased with radial offset from the center 240. Nevertheless, the collection fiber profile may be set to its maximum refractive angle across its entire end face. In this fashion, the ability of the collection fiber to collect light close to, and directly in front of, the end face of the emitter fiber is maximized.

Ray analysis, conducted in keeping with the previously described methodology, aids in the design of the profile of the collection fibers 106 to achieve desired optical characteristics. By extending the rays outside of the window 108, the illumination and reception zones may be projected to aid in designing the profile of the collection fibers 106. For ease of graphical analysis, the limiting rays for the collection fibers 106 may be drawn as emitting light rays that are internally oriented within the normal propagation limits of the collection fibers 106, the window 108, and the medium 123 outside the window. By analyzing the limiting rays and reversing the perspective, the reception characteristics of the collection fiber 106 are readily mapped and defined.

For extremely dark or turbid media, such as rubber, paint, clay, etc., the collection fibers 106 should view directly on or near the portion of the outer face 122 of the window 108 within the illumination zone 126. Therefore, the slope of the profile of the collection fibers 106 should be particularly steep for this type of application. A steep profile allows the collection fibers 106 to view the illuminated portion of the medium-window interface, avoids collection of unwanted specular reflections, and collects desired scattered light within the subject medium near the outer face 122 of the window 108. But the profile of the collection fibers 106 should not be steeper than is necessary to achieve the desired overlap between the illumination and reception zone. An over aggressive profile unnecessarily spaces the collection fibers 106 from the inner face 121 of the window 108, which reduces the coupling efficiency.

Similarly, by crafting the profile of the emitter fiber 104 near, or even beyond, its maximum angle profile 235, the emitted light is projected onto the outer face 122 of the window 108 further toward the end face of the right collection fiber 106b, and its field of view, that it would be otherwise. Thus, a large percentage of rays emitted from the emitter fiber 104 to the left of the fiber's center axis 200 cross over the axis and into the reception zone of the right collection fiber 106b. Although the rays reflected from the window's outer face 122 enter the end face of the collection fiber 106b, the end face of the emitter fiber 104 may be shaped to control the angular orientation of this back-reflected light so that it cannot be propagated by the collection fiber by forcing its angular orientation to be outside of the fiber's −8.5° to 8.5° propagation limits.

For media that are dark but not fully opaque, the slope of the collection fiber should be less steep than for opaque media. Interaction between the illumination zone 126 and the reception zones 150 at the appropriate depth into the subject media enhances efficient optical performance. As a general rule, the darker and more Rayleigh scattering the medium outside of the window 108, the more critical it is to achieve illumination and reception zone overlap at or close to the outer face 122 of the window 108. Even in clear media, significant efficiency benefits are achieved by directing the reception zones 150 of the collection fibers 106 significantly off-axis.

The profile of the collection fibers 106 may also be designed for efficient analysis of other materials, such as powder crystals. In many cases, the planar surfaces of the individual powder crystals tend to align themselves with the outer face 122 of the window 108. Thus, specular reflection from the crystals' planar surfaces are often rejected in a similar fashion to the specular reflection from the outer face 122 of the window 108. The profile of the collection fibers 106 may also be manipulated to avoid or collect other reflections, as desired. For example, the depth at which the illumination zone 126 and the reception zones 150 overlap may be manipulated to avoid planar reflections close to the outer face 122 of the window 108 and collect diffuse reflection, Raman, or fluorescence light from deeper within the subject medium.

As another example, the probe can be used in a low refractive environment, such as air, without a window. The refractive index of the environment need only be low in relation to the refractive index of the fiber's core material. Thus, if the core material has a sufficiently high refractive index, the probe can be successfully deployed in water or other similar aqueous media. Without a window, the probe can be successfully used to analyze surfaces. Here, benefit is gained by controlling the light's interaction with the surface in similar fashion to controlling light's interaction with a window's outer surface. Similarly, the methodology of profile design to achieve light control of illumination and collection patterns is directly applicable without either a window or a surface. Those skilled in the art will appreciate that the window example was described in detail to best illustrate and teach the design methodologies and theory, which may be readily applied to other probe interface configurations.

Once the profile of the collection fibers 106 is designed to achieve the desired optical characteristics using the methodology described above, the resulting probe is tested and refined through an optimization process using experimental results obtained under the expected operating conditions of the probe. This optimization step is very important because in any physical implementation, light propagation varies significantly from the theoretical results predicted by the basic light propagation equations. For example, launch conditions, micro bending, and macro bending produce significant variance from the equation predictions.

Light propagating outside the normal propagation limits is another important design consideration, especially in low light level applications such as Raman spectroscopy and certain fluorescence measurements. When light propagates within a fiber, it is scattered by interaction with the fiber's materials. For example, upon laser light interaction with the silica core, silica-Raman light is generated. Fluorescence is also generated and is especially strong for sources which tend toward the green, blue, and ultraviolet portion of the spectrum. The scattered light is typically generated at angles such that a portion of it is wave guided and propagates normally along with the desired source light. Another portion of the scattered light overfills the fiber. When the emitter fiber 104 is overfilled with extraneous light, such as silica-Raman and fiber fluorescence, this extraneous light encounters the end face of the emitter fiber 104 at angles outside of the normal propagation limits 210.

The design of the profile of the probe tip 100 can be adapted to deal with the overfilled aspects of the extraneous light within the core. Within the basic equations, the overfilled aspects of the extraneous light may be considered by simply increasing the angular propagation limits 210 for the fiber. Extraneous light is also present within the cladding. To minimize cladding propagation, the coat or buffer surrounding the cladding should have a higher refractive index than the cladding. Polyimide coating is well suited to this task for most silica core, silica clad fibers.

As stated earlier, the collection and emitter functions may be swapped within the bundle 102 so that the center fiber 104 is a collector and the surrounding fibers are emitter fibers 106. In this configuration, the emitter fibers 106 tend to project reflected light onto the end face of the collection fiber 104. But this back-reflected light is substantially precluded from propagation within the center collector fiber 104 due to the angular orientation of the back-reflected light, which falls outside the propagation limits of the center collection fiber 104. Therefore, the majority of the back-reflected light that enters the end face of the center collection fiber 104 is stripped off by the cladding and, thus, cannot sustain propagation within the collection fiber.

Another factor in this center-collector configuration is that when the surrounding fibers are used as emitter fibers 106, the control available over the illumination zone is less spatially specific. And, even though the first bounce of back-reflected light is substantially precluded from propagating within the collection fiber 104, multiple bounces occur within the housing chamber. These multiple bounces amplify the influence of surface imperfections on the optical surfaces and, thus, randomize the orientation of the bouncing light and result in the potential introduction of reflected light into the collection fiber 104.

Nevertheless, the center-collector configuration is preferred for certain applications. For these applications, the selection of the center-collector configuration is usually determined, at least in part, by the characteristics of the source that injects light into the fiber and/or the detector that ultimately receives the collected light. For light sources having large illumination patterns, such as lamps, coupling their light into the surrounding fibers, rather than a center fiber, is often more efficient. And in certain measurements, such as color measurements that involve correlation to human visual perception, benefit is gained from illuminating the subject through as many angular orientations as possible. This illumination objective is also important in certain diffuse reflectance measurements for chemical analysis.

The center-emitter configuration is preferred for certain other applications. For example, for applications using well-collimated light sources, such as lasers that can be focused to a minute spot size and are efficiently injected into the center fiber, there is no benefit from splitting the laser to inject it into multiple surrounding fibers. In addition, many electro-optical detectors efficiently accept light from a narrow slit. For these detectors, utilizing the surrounding fibers for light collection is often preferred so that the proximal ends of the fibers can be stacked on top of one another for coupling into the detector.

The design methodology described above is obviously conducive to computer programming techniques that are well known to those versed in the art. For design ease, it may be preferable to design the final profile as a piece-wise linear approximation. This allows the profile to be formed onto the fiber tip in discrete steps during the manufacturing process. Alternatively, a profile that is designed as a piece-wise linear shape may be readily transformed into a smooth curve by employing common curve fitting mathematical techniques or employing smoothing associated with the fabrication process. A smooth physical profile is usually preferred to avoid propagation divergence that occurs at the sharp breaks of a piece-wise linear shape.

In addition, an in-depth design analysis can be conducted to optimize subtle optical effects and interactions. The design model can be very sophisticated; however, this is not typically required or preferred. The end performance will be based on many subtle system variables that usually prove difficult to model. Experience teaches that a first-order design should be carried out in accordance with the presented methodology. Further optimization should be based on testing feedback from physical implementations incorporating all system components.

For certain configurations and components, the surface reflections cannot be adequately manipulated to preclude back reflection interference. In these instances, several adaptations can be implemented to assist in circumventing the problem:

1. Replace center fiber with a larger diameter fiber.
2. Separate the center fiber from the adjacent fibers. This can be accomplished in several ways including insertion of a spacer and substitution of fiber with thicker cladding or coating. However, optical efficiency dramatically decreases for any significant emitter-collector separation. To maximize the coupling efficiency, the emitter-collection fiber spacing should be minimized.
3. Reduce the thickness of the window.
4. Add a convex aspect to the outer face of the window.
5. Replace the center fiber with a fiber having a lower numerical aperture. This has the additional benefit of reducing the wave guiding and propagation of fiber-induced silica-Raman, fiber fluorescence, and similar interfering light.
6. Replace the surrounding fibers with lower numerical aperture fibers. By this means, reflected light will still enter the fiber but it will not be readily wave guided.
7. Replace the window with a higher index of refraction material to reduce the light ray divergence within the window, thus reducing the displacement of the reflected rays towards the collection fibers. However, the second-surface reflected rays are stronger when the refractive index differential (i.e., the refractive index differential between window and external medium) increases.

Cross talk between the fibers can be minimized by utilizing a light-absorbing bonding agent to adhere all the fibers together. A cross talk inhibitor should be added between the optical fibers. For example, a carbon-black loaded epoxy may be used to bind the fibers together. Alternatively, the fibers may be separated by a metallic film, such as a vapor-deposited platinum coating, applied to the outer longitudinal surfaces of the fibers. This has the further advantage of minimizing light interactions between the source light and the epoxy or other adhesive holding the bundle together.

An anti-reflective coating, such as magnesium fluoride, applied to the outer face of the window reduces the generation of back reflection for applications in which anti-reflective coatings can be utilized. By applying an anti-reflective coating to the window's inner face, ghost reflections of the back-reflected light are reduced. The anti-reflective coating applied to the inner face of the window provides the additional benefit of reducing first-surface reflections and increasing optical efficiency. Application of an anti-reflective coat on the end faces of the fibers not only increases light transfer and coupling efficiency, but also facilitates the controlled acceptance of back-reflected light where it is intended.

For best performance, the surface finish on all optical surfaces should be finely polished and high quality (e.g., at least 0.3 micron). Fibers and windows should be fabricated from fluorescence-free materials among the highest quality available and without inclusions. Sapphire, if utilized, should be ultraviolet grade and free of voids, impurities, and transition metals. For ultra-sensitive analysis, the fibers should be particularly high quality. Fibers whose core and cladding are of different materials (for example, plastic-clad silica-core) have been shown to be prone to problems in ultra-sensitive analysis such as variability to temperature and introduction of spectral signature characteristics of cladding materials.

As an alternative approach to directing the back-reflected light back into the emitter fiber, it may be directed to a non-active portion of the assembly. If so, subsequent reflections should be attenuated through use of light-absorbing materials, redirected outside of the assembly, or caught in a light trap.

The described design methodology also accommodates probes incorporating off-axis manipulation of both illumination and collection fibers. In certain circumstances, the analytical design increments are two-dimensional areas on the fiber end face. Each area is typically a small square.

FIG. 13 is a side cross-sectional view of a fiber optic probe tip 300 designed in accordance with an embodiment of the present invention. The fiber optic probe tip 300 is similar to the fiber optic probe tip 100 described previously, except that the window 108 has been replaced by an encapsulent window 302. In addition, the profile of the end face of the bundle 102 may be altered to achieve the design objectives in view of the different refraction characteristics resulting from the different refraction index of the material forming the encapsulent window 302 and the elimination of the space between the end face of the bundle 102 and the inner face of the encapsulent window 302.

The encapsulent window 302 is formed of material having a lower refractive index than the cores of the emitter fiber 104 and the collection fibers 106. The outer face 304 of the encapsulent window 302 is perpendicular to the longitudinal axis of the probe tip 300 and should be as smooth and defect free as is practicable. The tubular outer casing 110 is typically flush with the outer face 304 of the encapsulent window 302. The center portion of the end face of the illumination fiber 104 may be fully or partially flat, and it may be partially or fully flush with the outer face 304 of the encapsulent window 302. Although not depicted, a thin outer sheet or film of transparent material, such as sapphire or diamond, may be attached to the outer face 304 of the encapsulent window 302 for additional isolation. The material forming the encapsulent window 302 may be selected to advantageously refract and manipulate the emission and reception zones of the fibers 104, 106. The solid architecture of the encapsulent window 302 may provide physical advantages including increased fiber isolation and the ability of the assembly to withstand increased pressure or mechanical abrasion.

FIG. 14 is a side cross-sectional view of a fiber optic probe tip 400 that includes an encapsulent window 402 having a convex aspect 404 in the outer face. The convex aspect 404 that helps to further reduce back reflection interference and may be shaped to provide additional control over back reflection. The convex aspect 404 also yields additional light manipulation upon rays outside the encapsulent when the probe is utilized in a gaseous environment. It also produces increased stand off between the fiber end face and the window's outer face, which may help to isolate the fibers and provide physical advantages in high pressure, chemically aggressive, or mechanically abrasive environments. The stand off also increases the overlap between emission and reception fields at and immediately beyond the window's outer face. As noted earlier, achieving this overlap close to the window is particularly valuable for applications involving opaque media.

For fibers whose cores are made of a material with a high refractive index, such as sapphire, a number of suitable encapsulent materials are available. And, as previously described, these fibers may be deployed without a window in certain liquid media. However, for silica fibers (core refractive index approximately 1.46), fewer material options are available to induce the required refraction. Certain fluoropolymers have refractive indices that are low enough to create desirable refractive effects. As a class, these polymers have excellent chemical resistance, which is a desirous feature for many applications. Several of the polymers have excellent optical properties in terms of good transmission and minimal scattering. Fluorinated ethylene-proplyene (FEP) has a refractive index of approximately 1.341–1.347, which may provide for a useful amount of refractive manipulation in some applications. FEP should be applied in the melt phase. The preferred application technique is by extrusion into the bundle. The FEP itself may restrain the bundle together, thereby eliminating the need for epoxy or another bonding agent. Perfluoroalkoxy fluorocarbon (PFA) can be similarly applied, withstands higher temperatures, but has less desirable optical properties. The refractive index of PFA is approximately 1.35.

In many applications, copolymers of 2,2-bistrifluoromethyl-4,5-difluoro-1,3-dioxole (PDD) are preferable. These polymers are manufactured and marketed by E. I. Du Pont de Nemours and Company, Wilmington, Del. under the trademark TEFLON AF and are available as solids or dissolved in solution. In comparison to other solids, PDD polymers have very low refractive indices (1.29–1.31) and excellent optical properties. PDD polymers can be applied as a liquid in a solvent carrier. Alternatively, they may be melt-applied. A multi-layer method of applying the PDD is more conducive to small quantity fabrication. In this method, the bundle is formed and bound in its tubular outer casing 110 to form a cavity at the probe tip. The cavity is then filled with the PDD-solvent solution. As the solvent is driven off with heat and evaporation, the level is gradually built up by applying multiple coats. After achieving a suitable quantity of the polymer, the assembly is taken to high temperature in accordance with the manufacturer's guidelines so that the polymer flows to fill any voids and eliminate surface irregularities.

Once the desired profile for the probe tip is designed using the methodology described previously, several types of machines may be used to impart the desired profile on the end of the fiber bundle. FIG. 15 is a diagram illustrating a computer-controlled machine 500 for manufacturing fiber optic probes in accordance with an embodiment of the present invention. The machine 500 imparts the desired profile on the end face a fiber optic bundle with modified conventional fiber optic processing equipment. The bundle is held by a holding device 502, such as a collet, chuck, or similar device that spins the bundle while maintaining an angular orientation. The bundle's axis of rotation is set so that the bundle spins about the desired profile's axis of symmetry. The profile's axis of symmetry may be concurrent with the bundle's central axis, or it may be offset. In addition, for certain probes, it may not be necessary or desirable to spin the fiber bundle.

A robotic arm 504, which is controlled by a computer 506, controls the angular orientation of the holding device 502. In this sense, robotic refers to the programmable nature of motion and not necessarily the degrees of freedom. The bundle is set so as to contact an abrasive rotating disk 508. The angle between the abrasive disk 508 and the axis of symmetry of the bundle defines the end face profile angle. The robotic arm 504, as controlled by the computer 506, changes the angle of orientation of the bundle with respect to the rotating disk's planar surface to impart the desired profile on the tip of the fiber optic bundle. The profile may be created in piece-wise linear angular steps, or it may be created as a smooth curve. A preferred method is to concurrently and continually change the end face's angular orientation and distance from the disk surface to impart a smooth profile on the end face of the bundle.

It should be noted that the fiber bundle may be spinning but otherwise stationary, and the rotating abrasive disk 508 may orbit around the bundle. For example, one method for implementing the robotic arm 504 is to employ a computer-numerical-controlled (CNC) lathe. The fiber bundle is mounted in the lathe's chuck or collet. The lathe spins the bundle. The rotating abrasive disk 508 is mounted in the lathe's tool post holder such that its position is controlled as the lathe's carriage moves under the control of the computer 506 for both cross feed and longitudinal feed. The lathe's compound rest, which also moves under the control of the computer 506, sets the angle of the surface of the rotating abrasive disk 508 relative to the axis of rotation of the fiber bundle. Thus, by feeding these robotic mechanisms in unison, under the control of the computer 506, the lathe forms the profile on the end of the fiber bundle.

Given a desired profile, the design of the computer-controlled robotic arm 504 and the other mechanical components required to construct the computer-controlled machine 500 to produce profiles within the desired tolerances is within the skill of those in the robotics arts. Therefore, these aspects of this embodiment will not be further described. Because many different profiles may be easily created, the computer-controlled machine 500 is well suited for testing and designing probe interfaces.

FIG. 16 is a diagram illustrating a cam-surface-controlled machine 600 for manufacturing fiber optic probes in accordance with an embodiment of the present invention. Once a desired probe profile has been established, it may be advantageous to construct the cam-surface-controlled machine 600 to manufacture many duplicate probe interfaces. The cam-surface-controlled machine 600 is similar to the computer-controlled machine 500, except that the robotic arm 504 controlled by the computer 506 is replaced by a cam surface 602, a drive unit 604, and a support arm 606.

The cam surface 602, which is shaped to impart the desired profile on the bundle, is positioned above and radially outward from a pivot point 608. The shape of the cam surface is determined by the desired profile in conjunction with a mathematical model of the motion of the machine 600. The support arm 606 includes a radially disposed pivot arm 610 that rotates about the pivot point 608. An "L" shaped yoke 612, which is slidably attached to the pivot arm 610 by way of a linear translation mechanism 614, attaches the pivot arm 610 to the holding device 502. The drive unit 604, which is connected to the pivot arm 610, is operative to cause the pivot arm 610 to rotate about the pivot point 608. As the pivot arm 610 rotates about the pivot point 608, a cam follower 616 attached to the bottom the of the yoke 612 rides along the cam surface 602. The linear translation mechanism 614 allows the yoke 612 to move radially as the cam follower 616 rides along the cam surface 602. Including gear reduction within the linear translation mechanism allows the cam surface 602 to be produced with common fabrication techniques.

This configuration allows the weight of the holding device 502 to urge the cam follower 616 into contact with the cam surface 602 as the tip of the bundle contacts the abrasive rotating disk 508. The drive unit 604 typically includes an electric motor that may be readily configured, for example through a system of gears, to drive the pivot arm 610 at an appropriate rate for imparting the desired profile on the tip of the bundle. Given a desired profile, the design of the cam surface and the other mechanical components required to construct the cam-surface-controlled machine 600 to produce profiles within the desired tolerances is within the skill of those in the mechanical arts. Therefore, these aspects of this embodiment will not be further described.

FIG. 17 is a diagram illustrating a computer-controlled laser ablation machine 700 for manufacturing fiber optic probes in accordance with an embodiment of the present invention. The laser ablation machine 700 is similar to the computer-controlled machine 500, except that the abrasive rotating disk 508 is replaced by a high power laser 702. For this machine, the holding device 502 typically remains stationary while spinning the bundle. The robotic arm 704 controlled by the computer 706 manipulates and directs the high power laser 702 to impart the desired profile on the bundle. Given a desired profile, the selection of the high power laser 702 and the design of the robotic arm 504 and any other mechanical components required to construct the laser ablation machine 700 to produce profiles within the desired tolerances is within the skill of those in the robotics and laser ablation arts. Therefore, these aspects of this embodiment will not be further described.

Once a fiber optic bundle having the desired profile has been fabricated, the bundle is typically mounted in the metal housing 110 with epoxy or other common fiber optic mounting techniques. The sapphire window 108 is attached to a short metal tube by brazing. The window assembly is then fixed to the metal housing, preferably by laser welding. In the welding process, a jig is used to hold the probe tip directly against the window. The jig preferably uses gravity or very minor pressure to ensure that contact is made. As an alternative, the window is not flat but created like a watch crystal with flat optical surfaces and a short side wall. This type of window is more readily attached to the probe body but is more difficult to fabricate from crystalline material.

In view of the foregoing, it will be appreciated that the present invention provides fiber optic interfaces, methods for designing fiber optic interfaces, and machines for manufacturing fiber optic interfaces that can readily reject the collection of stray light, and more generally specular reflections, while efficiently collecting desired light that has interacted with the subject media. It should be understood that the foregoing relates only to specific embodiments of the present invention, and that numerous changes may be made therein without departing from the spirit and scope of the invention as defined by the following claims.

I claim:

1. An optical interface for a fiber optic device, comprising:

an emitter fiber defining an end face and a longitudinal axis, the emitter fiber operable for emitting light defining an illumination zone;

a window having an inner face positioned proximate to the end face of the emitter fiber, and an outer face longitudinally spaced from the inner face;

the end face of the emitter fiber progressively slopes away from the outer face of the window with increased radial offset from the longitudinal axis of the emitter fiber;

a collection device positioned proximate to the end face of the emitter fiber; and the end face of the emitter fiber shaped to substantially prevent normally-propagating light emerging from the end face of the emitter fiber and reflecting off the outer face of the window from collection by the collection device.

2. The optical interface of claim 1, wherein:

the collection device further comprises a collector fiber substantially parallel to the emitter fiber and defining an end face that is adjacent to the end face of the emitter fiber, the collector fiber operable for collecting light within a reception zone; and the end face of the collector fiber shaped to direct the reception zone toward the illumination zone.

3. The optical interface of claim 1, wherein:

the end face of the emitter fiber includes a central profile section that is substantially perpendicular to the longitudinal axis of the emitter fiber; and the end face of the emitter fiber includes an outer rim profile section that slopes away from the outer face of the window.

4. The optical interface of claim 3, wherein:

the outer rim profile section of the emitter fiber progressively slopes away from the outer face of the window with increased radial offset from the longitudinal axis of the emitter fiber.

5. The optical interface of claim 2, wherein:

the end face of the collector fiber slopes away from the outer face of the window with a slope at least as great as the maximum slope of the end face of the emitter fiber.

6. The optical interface of claim 5, wherein:

the end face of the collector fiber progressively slopes away from the outer face of the window with increased radial offset from the longitudinal axis of the emitter fiber.

7. The optical interface of claim 1, wherein:

the profile of the end face of the emitter fiber lies substantially between a minimum angle profile and a maximum angle profile;

the minimum angle profile defined to approximate a profile that is, minimized at its center point while directing the normally-propagating light emitted from the end face of the emitter fiber and reflecting off of the outer face of the window into the emitter fiber, and progressively sloped with radial offset across the end face of the emitter fiber so that the slope remains minimized while directing the normally-propagating light emitted from the end face of the emitter fiber and reflecting off of the outer face of the window into the emitter fiber; and the maximum angle profile defined to approximate a profile that is, maximized near its center point while directing the normally-propagating light emitted from the end face of the emitter fiber and reflecting off of the outer face of the window into the emitter fiber, and progressively sloped with radial offset across the end face of the emitter fiber so that the slope remains maximized while directing the normally-propagating light emitted from the end face of the emitter fiber and reflecting off of the outer face of the window into the emitter fiber.

8. The optical interface of claim 7, wherein:

the end face of the emitter fiber includes a central profile section that is substantially perpendicular to the longitudinal axis of the emitter fiber; and the end face of the emitter fiber includes an outer rim profile section that progressively slopes away from the outer face of the window.

9. The optical interface of claim 7, wherein:

the end face of the emitter fiber is substantially pointed at the longitudinal axis of the emitter.

10. The optical interface of claim 7, wherein:

the collection device further comprises a collector fiber substantially parallel to the emitter fiber and defining an end face that is adjacent to the end face of the emitter fiber, the collector fiber operable for collecting light within a reception zone.

11. The optical interface of claim 10, wherein:

the end face of the collector fiber progressively slopes away from the outer face of the window with increased radial offset from the longitudinal axis of the emitter fiber.

12. The optical interface of claim 10, wherein the collector fiber is a first collector fiber, further comprising:

a second collector fiber substantially parallel to the emitter fiber and defining an end face that is adjacent to the end face of the emitter fiber, the second collector fiber operable for collecting light within a reception zone;

the end face of the second collector fiber shaped to direct the reception zone toward the illumination zone.

13. The optical interface of claim 12, wherein:

the emitter fiber and the first and second collector fibers are aligned so that the longitudinal axes of the fibers lie substantially in the same plane.

14. The optical interface of claim 10, further comprising:

a plurality of additional collector fibers substantially parallel to the emitter fiber and defining end faces that are adjacent to the end face of the emitter fiber, the collector fibers forming a ring of collector fibers surrounding the emitter fiber, each collector fiber operable for collecting light within a reception zone;

the end face of each collector fiber shaped to direct the reception zone toward the illumination zone.

15. The optical interface of claim 14, wherein:

the end face of each collector fiber slopes away from the outer face of the window with a slope at least as great as the maximum slope of the end face of the emitter fiber, and the end faces of the emitter fiber and the collectors fibers define a combined profile that is symmetrical about the longitudinal axis of the emitter fiber.

16. The optical interface of claim 15, wherein:

the end face of each collector fiber progressively slopes away from the outer face of the window with increased radial offset from the longitudinal axis of the emitter fiber.

17. The optical interface of claim 7, wherein:

the outer face of the window is substantially perpendicular to the longitudinal axis of the emitter.

18. The optical interface of claim 7, wherein:

the outer face of the window defines a convex profile.

19. The optical interface of claim 7, wherein:

the outer face of the window defines a convex central profile section.

20. The optical interface of claim 7, wherein:

the inner face of the window is substantially perpendicular to the longitudinal axis of the emitter.

21. The optical interface of claim 10, wherein:

the window encapsulates the emitter fiber and collector fiber end faces.

22. The optical interface of claim 21, wherein:

the inner face of the window is in contact with the end faces of the emitter and collector fibers.

23. The optical interface of claim 7 integrally incorporated into a fiber optic cable.

24. The optical interface of claim 7 incorporated into a fiber optic tip for removable attachment to a fiber optic cable.

25. The optical interface of claim 10, wherein:

the end faces of the emitter fiber and the collector fiber are configured so that the illumination zone overlaps with the reception zone at or proximate to the outer face of the window.

26. The optical interface of claim 13, wherein:

the end faces of the emitter fiber and the collector fiber are configured so that the illumination zone overlaps with the reception zone at a predefined depth within a subject under inspection so as to avoid the collection of reflected light from a first component of the subject under inspection and to collect reflected light from a second component of the subject under inspection, the first component being closer to the outer face of the window than the second component.

27. The optical interface of claim 10, wherein:

the end faces of the emitter fiber and the collector fiber are configured to substantially prevent silica-Raman light emerging from the end face of the emitter fiber and reflecting off the outer face of the window from entering the end face of the collector fiber.

28. The optical interface of claim 7, wherein:

the end face of the emitter fiber is configured to accentuate the divergence of the illumination zone.

29. The optical interface of claim 7, wherein:

the end face of the emitter fiber is configured to accentuate the convergence of the illumination zone.

30. An interface for a fiber optic device, comprising:

an emitter fiber defining an end face and a longitudinal axis;

a collector fiber substantially parallel to the emitter fiber and defining an end face that is adjacent to the end face of the emitter fiber, the collector fiber operable for collecting light within a reception zone; and the end face of the emitter fiber shaped to substantially prevent normally-propagating light emerging from the end face of the emitter fiber and reflecting off a surface that is proximate to the end face of the emitter fiber from entering the end face of the collector fiber.

31. The optical interface of claim 30, wherein:

the profile of the end face of the emitter fiber lies substantially between a minimum angle profile and a maximum angle profile;

the minimum angle profile defined to approximate a profile that is,
  minimized at its center point while directing the normally-propagating light emitted from the end face of the emitter fiber and reflecting off of the surface and into the emitter fiber, and
  progressively sloped with radial offset across the end face of the emitter fiber so that the slope remains minimized while directing the normally-propagating light emitted from the end face of the emitter fiber and reflecting off of the surface and into the emitter fiber; and the maximum angle profile defined to approximate a profile that is,
  maximized near its center point while directing the normally-propagating light emitted from the end face of the emitter fiber and reflecting off of the surface and into the emitter fiber, and
  progressively sloped with radial offset across the end face of the emitter fiber so that the slope remains maximized while directing the normally-propagating light emitted from the end face of the emitter fiber and reflecting off of the surface and into the emitter fiber.

32. The optical interface of claim 31, wherein:

the end face of the emitter fiber includes a central profile section that is substantially perpendicular to the longitudinal axis of the emitter fiber; and the end face of the emitter fiber includes an outer rim profile section that slopes away from the surface.

33. The optical interface of claim 32, wherein:

the outer rim profile section of the emitter fiber progressively slopes away from the surface with increased radial offset from the longitudinal axis of the emitter fiber.

34. The optical interface of claim 31, wherein:

the surface is an end face of a window positioned adjacent the end faces of the emitter and collector fibers: and the inner face of the window is in contact with the end faces of the emitter and collector fibers.

35. The optical interface of claim 31 integrally incorporated into a fiber optic cable.

36. The optical interface of claim 31 incorporated into a fiber optic tip for removable attachment to a fiber optic cable.

37. A method for designing an optical interface for a fiber optic device including an emitter fiber defining an end face and a longitudinal axis, the emitter fiber operable for emitting light defining an illumination zone, and a collector fiber substantially parallel to the emitter fiber and defining an end face that is adjacent to the end face of the emitter fiber, the collector fiber operable for collecting light within a reception zone, comprising the steps of:

shaping the end face of the emitter fiber to substantially prevent normally-propagating light emerging from the end face of the emitter fiber and reflecting off a surface approximately the end face of the emitter fiber from entering the end face of the collector fiber; and shaping the end face of the collector fiber to direct the reception zone toward the illumination zone.

38. The method of claim 37, further comprising the steps of:

defining a minimum angle profile to approximate a profile that is,
  minimized at its center point while directing the normally-propagating light emitted from the end face of the emitter fiber and reflecting off of the surface proximate the end face of the emitter fiber into the emitter fiber, and
  progressively sloped with radial offset across the end face of the emitter fiber so that the slope remains minimized while directing the normally-propagating light emitted from the end face of the emitter fiber and reflecting off of the surface proximate to the end face of the emitter fiber into the emitter fiber; and the maximum angle profile defined to approximate a profile that is,
  maximized near its center point while directing the normally-propagating light emitted from the end face of the emitter fiber and reflecting off of the surface proximate to the end face of the emitter fiber into the emitter fiber, and
  progressively sloped with radial offset across the end face of the emitter fiber so that the slope remains maximized while directing the normally-propagating light emitted from the end face of the emitter fiber and reflecting off of the surface proximate to the end face of the emitter fiber into the emitter fiber; and shaping the end face of the emitter fiber to lie substantially between the minimum angle profile and the maximum angle profile.

39. The method of claim 38, further comprising the steps of:

shaping the end faces of the emitter fiber and the collector fiber so that the illumination zone overlaps with the reception zone at or near the outer face of the window.

40. The method of claim 38, wherein surface proximate to the end face of the emitter fiber comprises a first component of a subject under inspection, further comprising the steps of:

shaping the end faces of the emitter fiber and the collector fiber so that the illumination zone overlaps with the reception zone at a predefined depth within a subject under inspection so as to avoid the collection of reflected light from the first component of the subject under inspection and to collect reflected light from a second component of the subject under inspection, the first component being closer to the end face of the emitter fiber than the second component.

41. The method of claim 38, further comprising the steps of:

shaping the end faces of the emitter fiber and the collector fiber to substantially prevent silica-Raman light emerging from the end face of the emitter fiber and reflecting off the outer face of the window from entering the end face of the collector fiber.

42. The method of claim 37, wherein the surface proximate to the end face of the emitter fiber is the outer face of a window having an inner face adjacent to the end faces of the emitter and collector fibers.

43. A machine for manufacturing an optical interface for a fiber optic device including an emitter fiber defining an end face and a longitudinal axis, the emitter fiber operable for emitting light defining an illumination zone, a collector fiber substantially parallel to the emitter fiber and defining an end face that is adjacent to the end face of the emitter fiber, the collector fiber operable for collecting light within a reception zone, and a window having an inner face positioned proximate to the end faces of the emitter and collector fibers, the window also having an outer face longitudinally spaced from the inner face, comprising:

means for shaping the profile of the end face of the emitter fiber to lie between a minimum angle profile and a maximum angle profile, the minimum angle profile defined to approximate a profile that is, minimized at its center point while directing the normally-propagating light emitted from the end face of the emitter fiber and reflecting off of the outer face of the window into the emitter fiber, and progressively sloped with radial offset across the end face of the emitter fiber so that the slope remains minimized while directing the normally-propagating light emitted from the end face of the emitter fiber and reflecting off of the outer face of the window into the emitter fiber; and the maximum angle profile defined to approximate a profile that is, maximized near its center point while directing the normally-propagating light emitted from the end face of the emitter fiber and reflecting off of the outer face of the window into the emitter fiber, and progressively sloped with radial offset across the end face of the emitter fiber so that the slope remains maximized while directing the normally-propagating light emitted from the end face of the emitter fiber and reflecting off of the outer face of the window into the emitter fiber; and means for shaping the end face of the collector fiber to direct the reception zone toward the illumination zone.

44. A machine for manufacturing an optical interface for a fiber optic device including an emitter fiber defining an end face and a longitudinal axis, the emitter fiber operable for emitting light defining an illumination zone, a collector fiber substantially parallel to the emitter fiber and defining an end face that is adjacent to the end face of the emitter fiber, the collector fiber operable for collecting light within a reception zone, and a window having an inner face positioned proximate to the end faces of the emitter and collector fibers, the window also having an outer face longitudinally spaced from the inner face, comprising:

a holding device restraining and spinning the emitter and collector fibers; and a shape imparting device configured to, shape the end face of the emitter fiber to substantially prevent normally-propagating light emerging from the end face of the emitter fiber and reflecting off the outer face of the window from entering the end face of the collector fiber; and shape the end face of the collector fiber to direct the reception zone toward the illumination zone.

45. The machine of claim 44, wherein the shape imparting device is further configured to:

shape the profile of the end face of the emitter fiber to lie between a minimum angle profile and a maximum angle profile;

the minimum angle profile defined to approximate a profile that is, minimized at its center point while directing the normally-propagating light emitted from the end face of the emitter fiber and reflecting off of the outer face of the window into the emitter fiber, and progressively sloped with radial offset across the end face of the emitter fiber so that the slope remains minimized while directing the normally-propagating light emitted from the end face of the emitter fiber and reflecting off of the outer face of the window into the emitter fiber; and the maximum angle profile defined to approximate a profile that is, maximized near its center point while directing the normally-propagating light emitted from the end face of the emitter fiber and reflecting off of the outer face of the window into the emitter fiber, and progressively sloped with radial offset across the end face of the emitter fiber so that the slope remains maximized while directing the normally-propagating light emitted from the end face of the emitter fiber and reflecting off of the outer face of the window into the emitter fiber.

46. The machine of claim 45, wherein the shape imparting device comprises:

an abrasive rotating disk;

a robotic arm connected to the holding device; and a computer for operating the robotic arm to articulate the holding device relative to the abrasive rotating disk to impart the shape on the emitter fiber and the collector fiber.

47. The machine of claim 45, wherein the shape imparting device comprises:

an abrasive rotating disk;

a cam surface in sliding contact with the holding device; and a drive mechanism for moving the holding device along the cam surface to impart the shape on the emitter fiber and the collector fiber.

48. The machine of claim 45, wherein the shape imparting device comprises:

a ablation laser;

a robotic arm connected to the ablation laser; and a computer for operating the robotic arm to articulate the ablation laser relative to the holding device to impart the shape on the emitter fiber and the collector fiber.

49. An interface for a fiber optic device, comprising:

a collector fiber operable for collecting light within a reception zone;

a ring of emitter fibers substantially parallel to the collector fiber and operable for emitting light defining an illumination zone, each emitter fiber defining an end face that is adjacent to the end face of the collector fiber;

a window having an inner face positioned proximate to the end faces of the emitter and collector fibers, and an outer face longitudinally spaced from the inner face; and the end face of each emitter fiber shaped to direct the illumination zone toward the collection zone.

* * * * *